(12) United States Patent
Fortenbery et al.

(10) Patent No.: US 6,736,254 B1
(45) Date of Patent: May 18, 2004

(54) OFF-SET BLOCK TILT TRAY SORTER WITH GAP DETECTOR

(75) Inventors: J. David Fortenbery, Charlotte, NC (US); David Patrick Erceg, Concord, NC (US)

(73) Assignee: Mantissa Corporation, Charlotte, NC (US)

( * ) Notice: Subject to any disclaimer, the term of this patent is extended or adjusted under 35 U.S.C. 154(b) by 0 days.

(21) Appl. No.: 10/146,649

(22) Filed: May 14, 2002

(51) Int. Cl.[7] .............................................. B65G 47/10
(52) U.S. Cl. .......................... 198/370.04; 198/370.03; 198/805
(58) Field of Search ..................... 198/370.04, 370.03, 198/808, 802, 805

(56) References Cited

U.S. PATENT DOCUMENTS

| | | | |
|---|---|---|---|
| 5,054,601 A | 10/1991 | Sjogren et al. | 198/365 |
| 5,664,660 A | 9/1997 | Prydtz et al. | 198/370.04 |
| 6,009,992 A | 1/2000 | Erceg et al. | 198/370.04 |
| 6,484,866 B1 * | 11/2002 | Fortenbery et al. | 198/370.04 |

* cited by examiner

Primary Examiner—Richard Ridley
(74) Attorney, Agent, or Firm—MacCord Mason PLLC

(57) ABSTRACT

A sorting conveyor for transporting objects and unloading objects at one or more unloading stations adjacent the conveyor. The sorting conveyor includes: a conveyor track; a train of conveyor carts connected end-to-end; a power source for moving the conveyor carts on the conveyor track; each of the conveyor carts including: (i) a trailer frame base, including: a roller structure for engaging the conveyor track, a driven member responsive to the power source, and a hitch mechanism for connecting each conveyor cart to an adjacent conveyor cart; (ii) a carrying tray for holding the objects; and (iii) a tiltable support apparatus for supporting the carrying tray above the trailer frame base and for allowing tilting of the carrying tray towards at least one side of the conveyor to unload objects into unloading stations on at least one side of the conveyor. The sorting conveyor includes an adjustment spacer between adjacent carts wherein the adjustment spacer is an adjustment spacer bar and a gap monitor for monitoring the gap between adjacent carts.

52 Claims, 20 Drawing Sheets

—PRIOR ART—

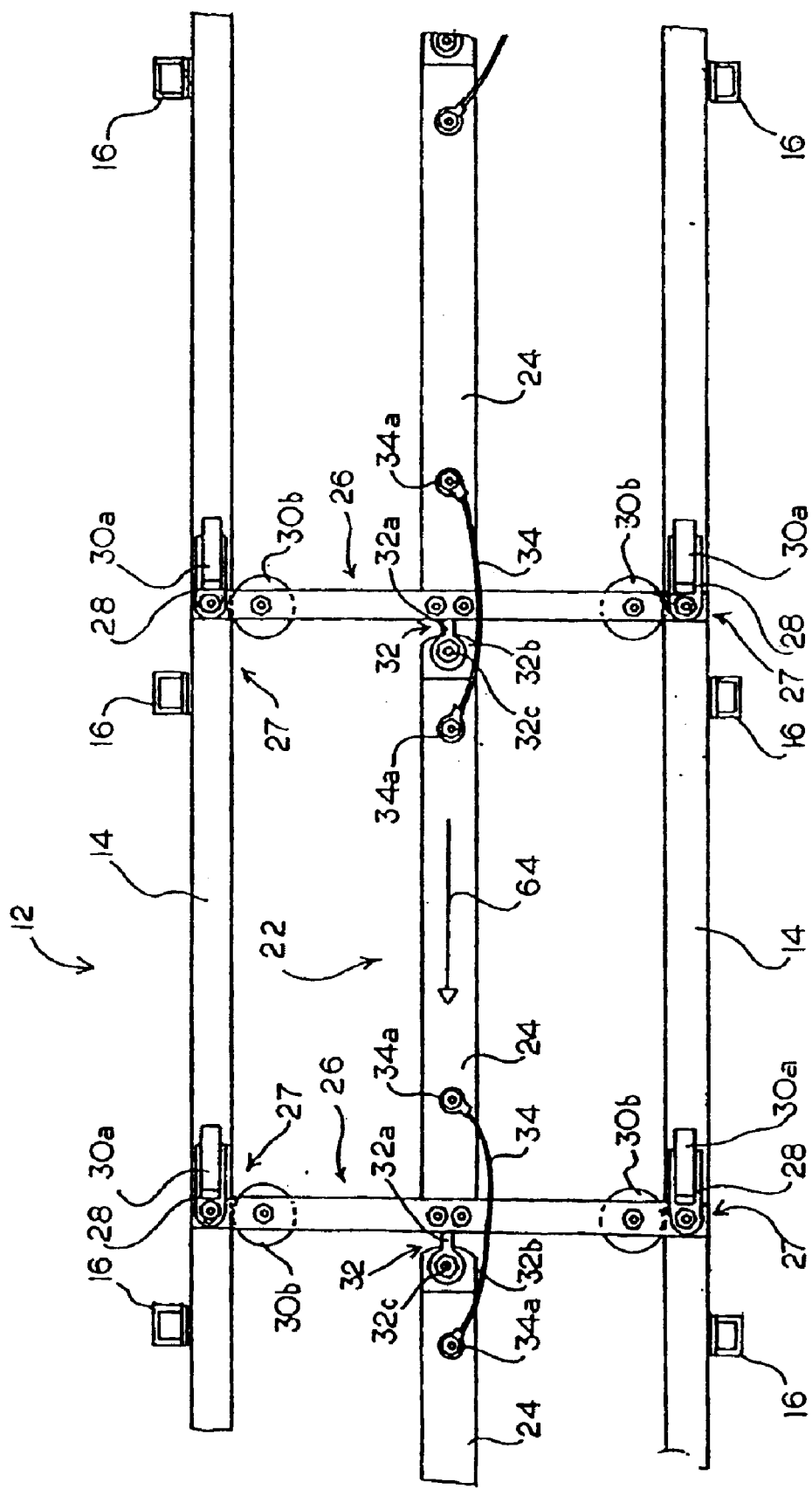

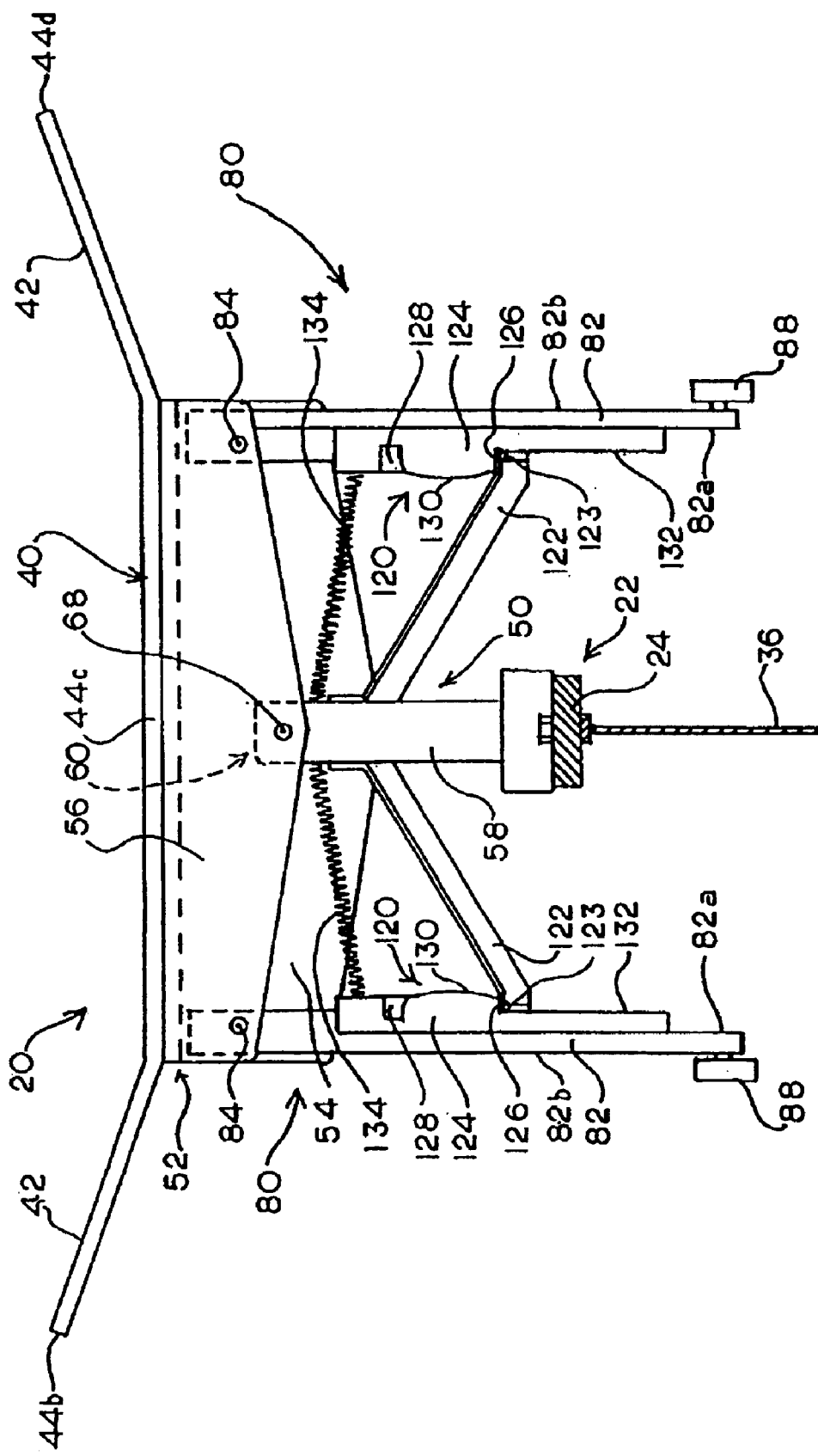
FIG. 7 —PRIOR ART—

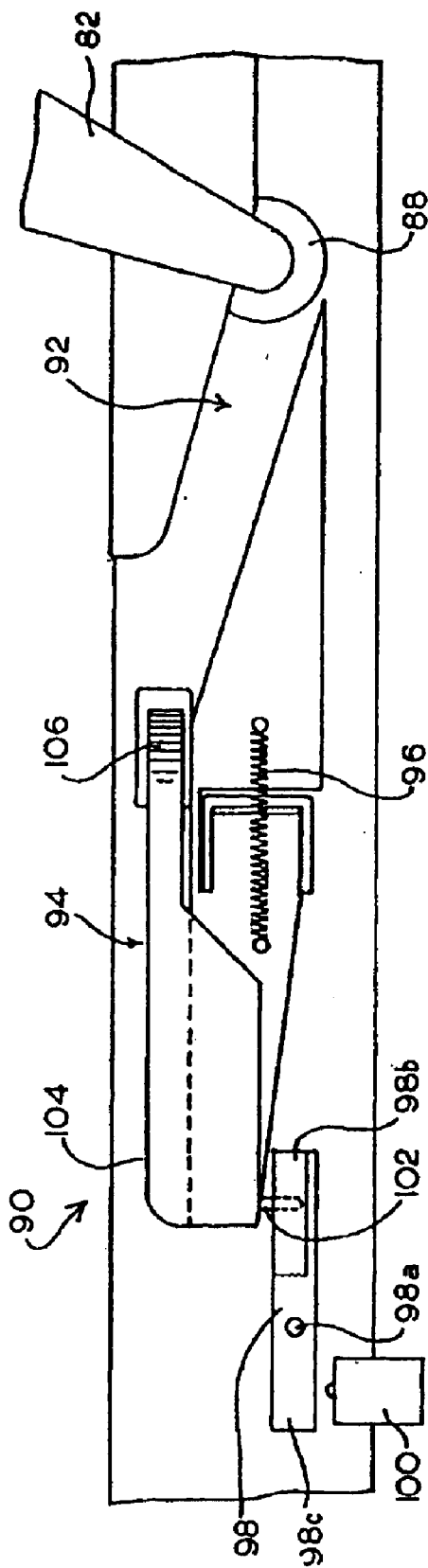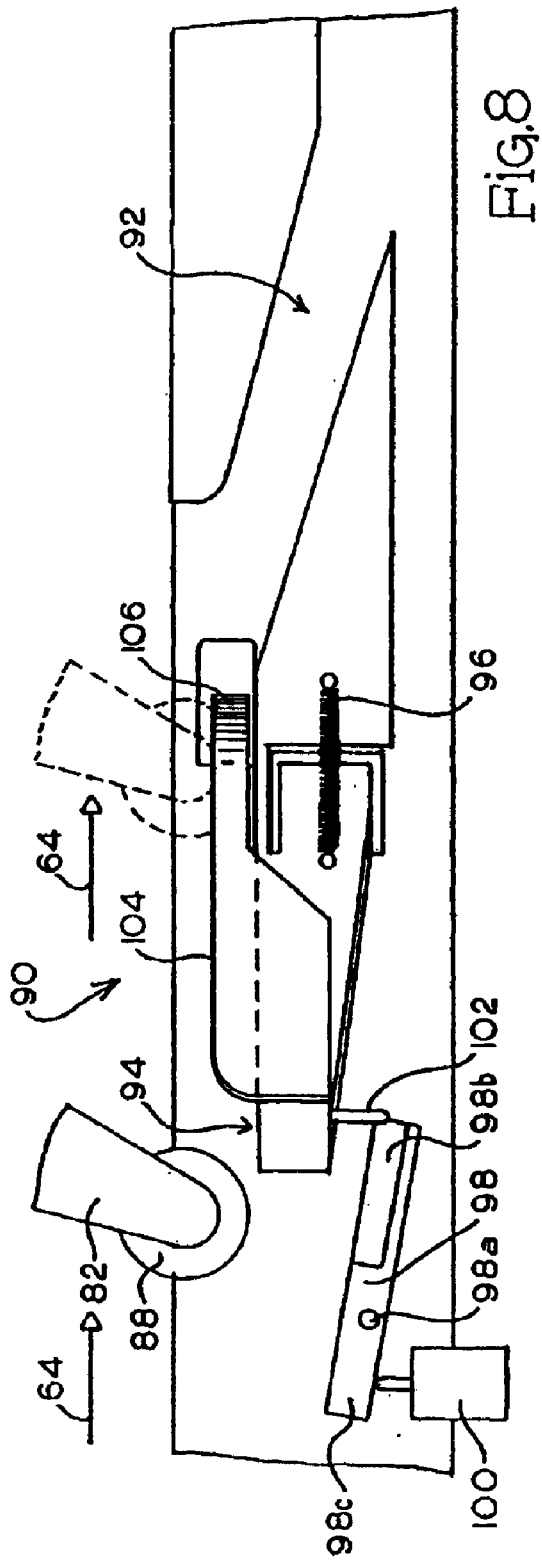

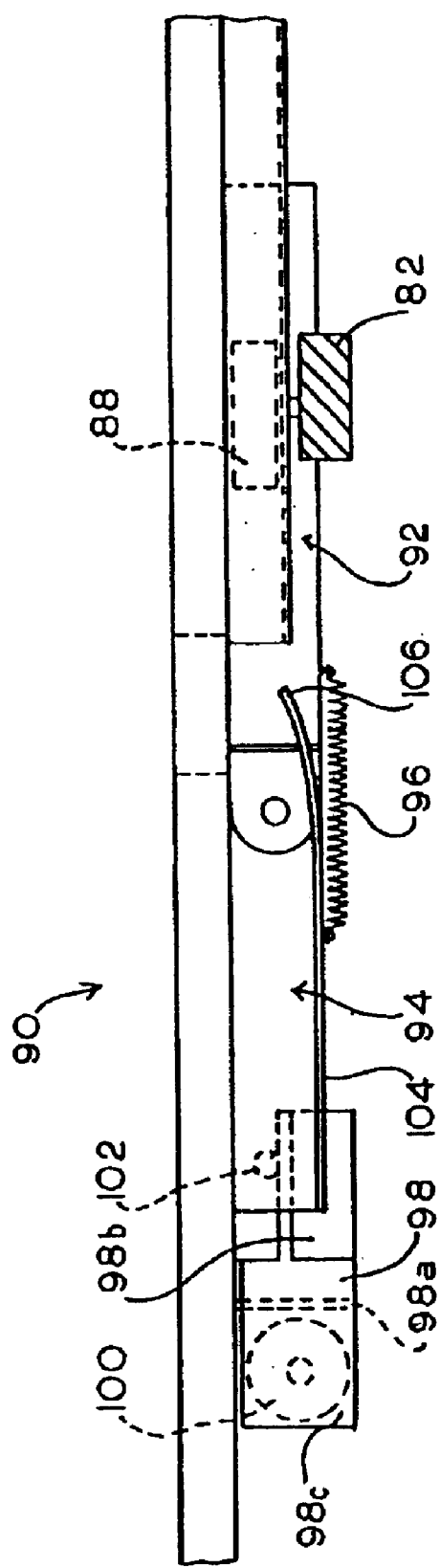
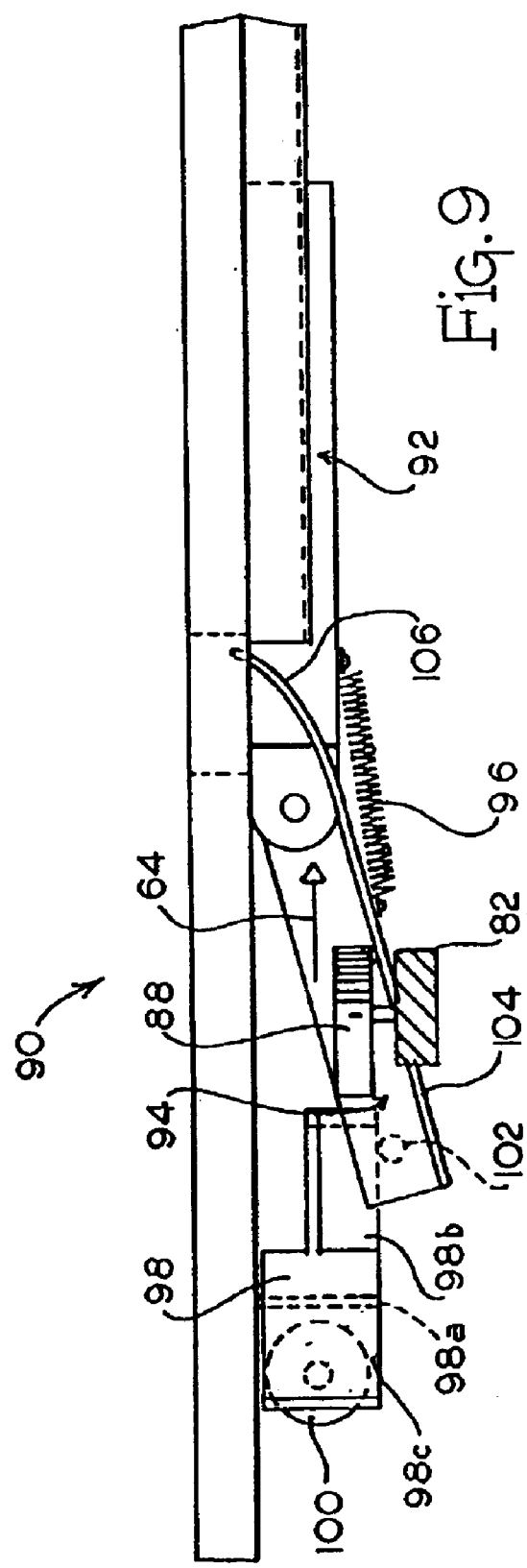

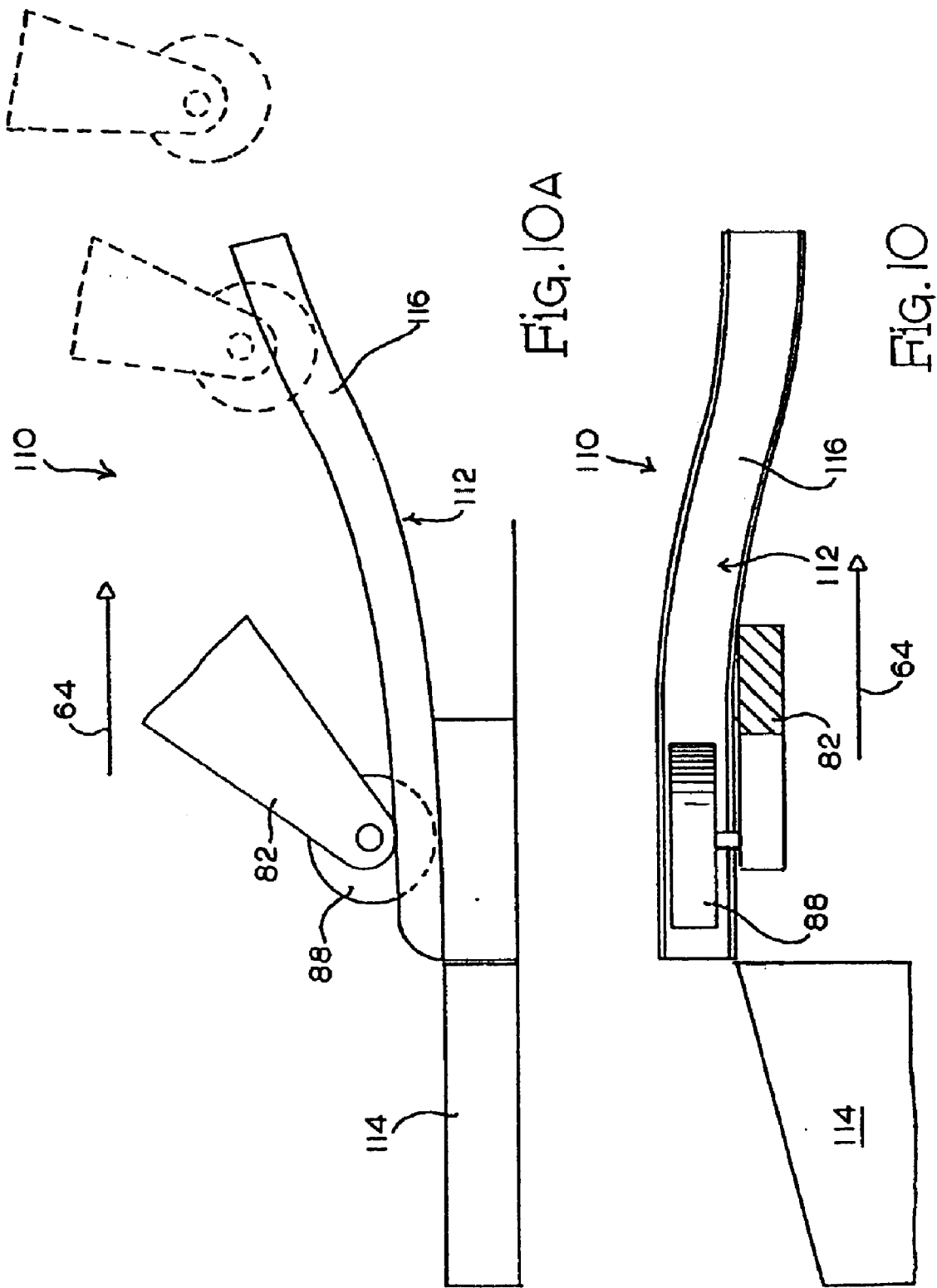

OFF-SET BLOCK TILT TRAY SORTER WITH
GAP DETECTOR

BACKGROUND OF THE INVENTION (1) Field of the Invention

The present invention relates generally to package sorting conveyors and, more particularly, to a system for adjusting and monitoring the distance between adjacent carts.

(2) Description of the Related Art

Conveyor systems having a number of individual carrying carts have been commonly used for many years to carry and sort packages or other items, such as mail. For example, U.S. Pat. No. 5,054,601 to Sjogren et al. discloses a package sorting conveyor comprised of a train of tilt tray carriers coupled in tandem to form a continuous loop. Each carrier includes a pivotally mounted tilt tray normally maintained in an upright position. The carriers are moved around the loop by a series of motors spaced around the loop. Branching out from the loop are outfeed chutes or the like for receiving packages from the carriers. When a particular carrier holding a particular package to be sorted reaches a selected outfeed chute, an actuator tilts the tray to dump the package into the outfeed chute. Another example of a typical package sorting conveyor is disclosed in International PCT Application Number PCT/DK90/00047 of Kosan Crisplant A/S, now U.S. Pat. No. 5,664,660.

Tilt tray sorters are installed as a closed-loop system. The track upon which the tilt trays are carried is manufactured to a fixed predetermined length based on the customer's specific requirements and building layout. Tilt trays are built upon a carrier or chassis assembly that is also of fixed length (typically twenty or twenty-four inches). Therefore, a particular track length is designed to have a certain number of tilt tray carriers. For example, if a particular application requires a track length of 525 feet, and the application requires a tilt tray on a twenty-four inch chassis, the track will be engineered to be either 524 feet or 526 feet, and will hold either 262 or 263 tilt tray sorters, respectively.

A difficulty has arisen in the installation of tilt tray sorter conveyors, and installing them on the prospective site. Typically, because of site variables and manufacturing tolerances, the installation of the carriers upon the track does not match in the field. During installation, it is not uncommon for the track to be short or long by several inches.

The solution in the past was to build a "TAKE-UP" using two expansion joints, which would allow the track installers to move large sections of track, after installation, to correct for the variables. The take-up was a movable platform, typically under a curved section of track. The track was fitted with expansion joints as necessary at each end of the curve. If the track needed to be lengthened, the curve was physically picked up and moved to extend the track, and expansion joints were placed on the track where it was lengthened. If the track needed to be shortened, portions of the track could be machined and the curve physically picked up and moved to shorten the track. The location of the expansion joint or machining caused a problem because of the noise that would be generated as the carts would move over this section of track. All of this was time consuming and required skilled experienced labor.

Rather than lengthening or shortening the track, a second way to accommodate for this installation variable was to lengthen the train of carts. This was done by installing spacers in the linkage of the carriers. The typical carrier has a form of ball joint connection between the carriers. In certain systems, the trailing carrier had a ball assembly, on an extending rod bolted to the axis frame. Adding spacers between the extending rod and the frame could effectively lengthen the extending rod. For example, if the track were two inches longer than anticipated, the installation team would install thirty-two $1/16^{th}$ inch spacers on carts throughout the train. Arranging the spacers uniformly throughout the train of carriers was found to be preferable. The installation team would remove the extending rod on the chosen carriers, add a spacer, and reinstall the extending rod.

Several problems have been noted with this procedure. First, access was difficult to the location of the connection between the extending rod and axis frame. The installers were forced to partially disassemble the tilt tray carrier in order to remove the extending rod. Second, once the spacers were installed, there was no visual indicator as to which carts were modified with the spacers. If a carrier were to need replacement, or if the bolt failed, there was no indicator that the particular cart had been effectively lengthened with a spacer.

Thus, there remains a need for a new and improved sorting conveyor in which the spacing between adjacent carts may be easily adjusted while, at the same time, the gap between adjacent carts may be monitored.

SUMMARY OF THE INVENTION

The present invention is directed to an improved sorting conveyor for transporting objects and unloading objects at one or more unloading stations adjacent the conveyor. Generally, the sorting conveyor includes: a conveyor track; a train of the tilting conveyor carts connected end-to-end; and a linear induction motor for moving the conveyor carts on the conveyor track.

Each of the tilting conveyor carts includes a trailer frame base. The trailer frame includes a roller structure for engaging the conveyor track, a driven member responsive to the linear induction motor including a guide roller assembly, and a hitch mechanism for connecting each tilting conveyor cart to an adjacent conveyor cart. The conveyor cart also includes a carrying tray for holding the objects and a tiltable support apparatus for supporting the carrying tray above the trailer frame base and for allowing tilting of the carrying tray towards at least one side of the conveyor to unload objects into unloading stations on at least one side of the conveyor.

The tilting mechanism tilts the carrying tray on the tiltable support apparatus to thereby unload objects into one of the unloading stations adjacent the conveyor. The improved tilting mechanism includes a pair of actuating arms attached to the carrying tray on opposite sides of the tiltable support apparatus and a pull-down mechanism associated with each unloading station for selectively pulling down one of the actuating arms so as to pull one side of the carrying tray downwardly into a tilted position.

In the present invention, each of the actuator arms includes a cam follower on a lower end of the actuator arm, and wherein the pull-down mechanism includes a descending ramp adjacent the conveyor track, and a laterally pivoting switch for directing the cam follower of a selected actuator arm into the descending ramp The present invention modifies the connection to the leading cart with an adjustment spacer bar. The "standard" connection bar is attached to the rearward end of the leading carrier. The standard connection bar is typically affixed to the carrier assembly by a pair of fasteners at opposing ends of the bar. A single hole is located in the standard connection bar. This hole receives a connecting bolt that connects the following cart through the following cart's extending rod through a ball joint. This connecting hole was typically co-linear with the fastener holes, equally spaced between the fastener holes and located in the center of the standard connection bar.

The adjustment bar is designed to be affixed to the leading cart in place of the standard connection bar. The adjustment spacer bar differs in that the connection hole is not co-linear with the fastener holes. The preferred embodiment uses a $1/16^{th}$ inch offset from the centerline of the adjustment spacer bar. Upon installation, if it is discovered that the train of carriers must be lengthened, the spacer bar is oriented in a way so that the offset hole is extending rearwardly from the centerline of the fastener holes. In this way, the effective length of the carrier is increased by $1/16$ inch.

Similarly, if the carriers must be shortened in order to fit on the track, the adjustment spacer bar is oriented in a way so that the offset hole is extending forwardly from the centerline of the fastener holes making the effective length of the carrier $1/16^{th}$ inch shorter. The number of adjustment spacer bars will vary depending upon the length that must be increased or decreased to fit the carriers on the track. The adjustment spacer bars should preferably be located uniformly and evenly throughout the train of carts.

In order to allow immediate recognition of which carts have been effectively "lengthened" or "shortened," the adjustment spacer bar can be colored differently from the normal spacer. In order to visually recognize whether the spacer was used to lengthen or shorten the effective length of the cart, the adjustment spacer bar can also be provided with some type of indicia, e.g., a chamfer on one corner, which would indicate whether the orientation was to lengthen or shorten.

Another significant aspect of the present invention is providing a gap monitor for monitoring gaps between successive carts. The gap monitor consists of three major elements: a plurality of detectable elements at predetermined positions on unique carts; at least one sensor for detecting the presence of the detectable elements; and, a comparator for evaluating the difference between the detectable elements and a reference value. The detectable elements can be the edges of unique carts and preferably are the trailing edge of a leading cart and the leading edge of the trailing cart. The sensor can be a proximity sensor and is preferably an inductive sensor. The comparator measures the difference in terms of time and the reference value is a predetermined distance.

In a preferred embodiment, the reference value is equal to the gap length between successive carts. If the gap monitor observes a value that is greater than the reference value, a signal will be sent to the controller and the sorter conveyor can be shut down for inspection of the gap.

Accordingly, one aspect of the present invention is to provide a sorting conveyor for transporting objects and unloading objects at one or more unloading stations adjacent the conveyor. The sorting conveyor includes: a conveyor track; a train of conveyor carts connected end-to-end; a power source for moving the conveyor carts on the conveyor track; each of the conveyor carts including: (i) a trailer frame base, including: a roller structure for engaging the conveyor track, a driven member responsive to the power source, and a hitch mechanism for connecting each conveyor cart to an adjacent conveyor cart; (ii) a carrying tray for holding the objects; and (iii) a tiltable support apparatus for supporting the carrying tray above the trailer frame base and for allowing tilting of the carrying tray towards at least one side of the conveyor to unload objects into unloading stations on at least one side of the conveyor; and an adjustment spacer between adjacent carts.

Another aspect of the present invention is to provide in a sorting conveyor for transporting objects and unloading objects at one or more unloading stations adjacent the conveyor, the sorting conveyor including: a conveyor track; a train of conveyor carts connected end-to-end; a power source for moving the conveyor carts on the conveyor track; each of the conveyor carts including: (i) a trailer frame base, including: a roller structure for engaging the conveyor track, a driven member responsive to the power source, and a hitch mechanism for connecting each conveyor cart to an adjacent conveyor cart; (ii) a carrying tray for holding the objects; and (iii) a tiltable support apparatus for supporting the carrying tray above the trailer frame base and for allowing tilting of the carrying tray towards at least one side of the conveyor to unload objects into unloading stations on at least one side of the conveyor, the improvement comprising an adjustment spacer between adjacent carts wherein the adjustment spacer is an adjustment spacer bar.

Still another aspect of the present invention is to provide a sorting conveyor for transporting objects and unloading objects at one or more unloading stations adjacent the conveyor. The sorting conveyor includes: a conveyor track; a train of conveyor carts connected end-to-end; a power source for moving the conveyor carts on the conveyor track; each of the conveyor carts including: (i) a trailer frame base, including: a roller structure for engaging the conveyor track, a driven member responsive to the power source, and a hitch mechanism for connecting each conveyor cart to an adjacent conveyor cart; (ii) a carrying tray for holding the objects; and (iii) a tiltable support apparatus for supporting the carrying tray above the trailer frame base and for allowing tilting of the carrying tray towards at least one side of the conveyor to unload objects into unloading stations on at least one side of the conveyor; an adjustment spacer between adjacent carts wherein the adjustment spacer is an adjustment spacer bar.; and a gap monitor for monitoring a gap between adjacent carts.

These and other aspects of the present invention will become apparent to those skilled in the art after a reading of the following description of the preferred embodiment when considered with the drawings.

BRIEF DESCRIPTION OF THE DRAWINGS

FIG. 3 depicts a train of trailer frame structures of the conveyor carts, as seen from the top, but with the tiltable support apparatuses and the carrying trays of the conveyor carts removed for clarity;

FIG. 7 is a rear view of the tilting conveyor cart taken along lines 7—7 of FIG. 4 with the track rails and the roller structure omitted for clarity, which shows the conveyor cart in its upright, horizontal position;

FIG. 8 is a side elevational view of the pull-down mechanism of the invention with its switch in an open position as it captures a passing roller wheel on a conveyor cart-actuating arm;

FIG. 8A is another side view of the pull-down mechanism, except with the roller wheel traveling through the descending ramp and the switch in its closed position;

FIG. 9 is a top view of the pull-down mechanism with the switch in its open position, capturing a passing roller wheel;

FIG. 9A is another top view of the pull-down mechanism, except with the roller wheel traveling through the descending ramp and the switch in its closed position;

FIG. 10 is a top view of the push-up mechanism;

FIG. 10A is a side view of the push-up mechanism;

DESCRIPTION OF THE PREFERRED EMBODIMENTS

Figure 1:
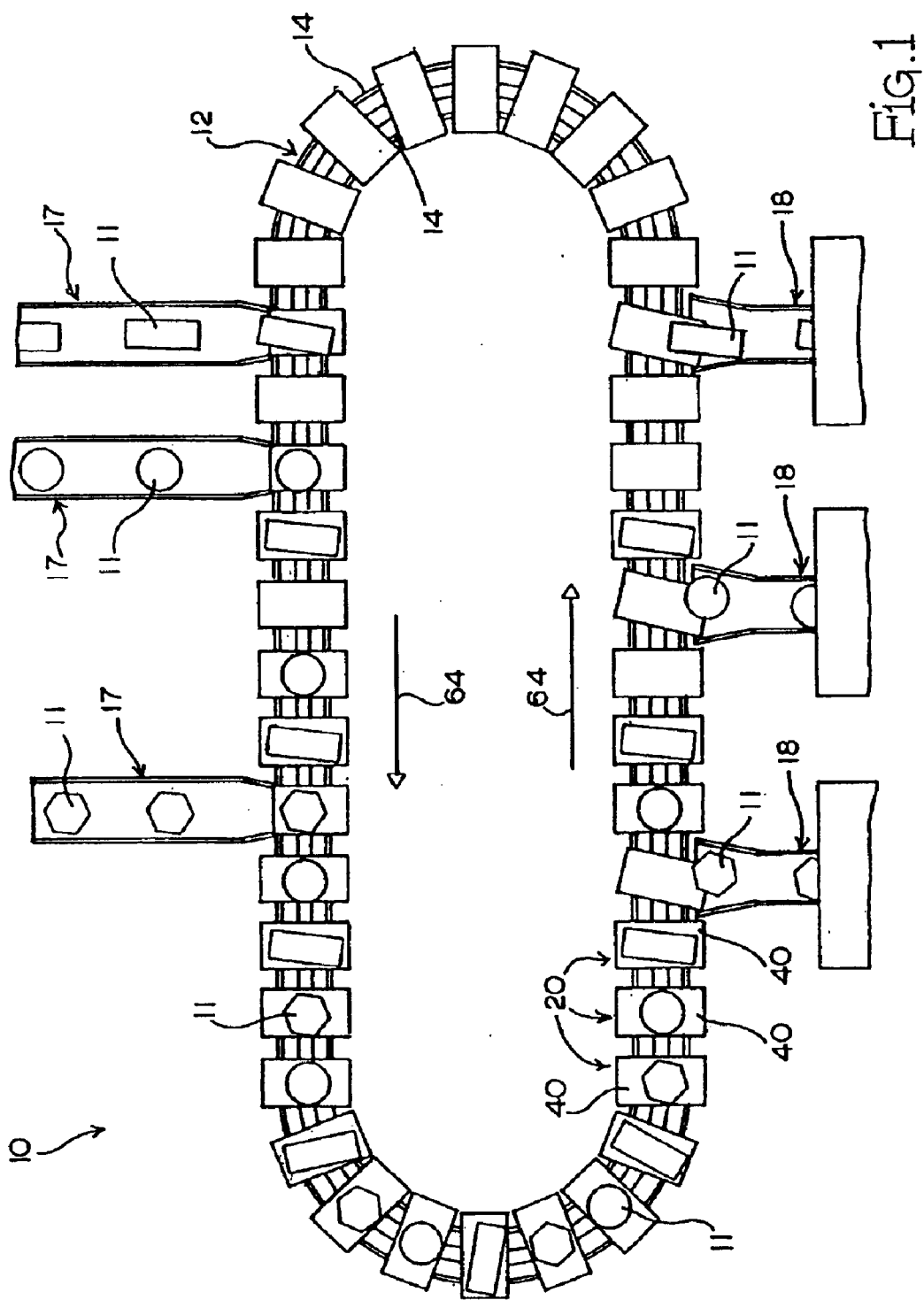
FIG. 1 is a schematic depiction of a package sorting conveyor constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As seen in FIG. 1, a sorting conveyor, generally designated 10, is shown constructed according to the present invention for transporting and sorting packages 11 or other objects. The sorting conveyor 10 comprises a train of individual carts 20, connected end to end, which preferably form an endless loop around a closed-circuit conveyor track 12. Alternately, the conveyor carts 20 of the invention could be used singly or as part of a finite train.

The package sorting conveyor 10 generally includes four major sub-assemblies: a conveyor track 12; an linear induction motor 70; the train of tilting conveyor carts 20, which are moved along the conveyor track 12 by the linear induction motor 70; and a tilting mechanism 80 for tilting the conveyor carts 20 to discharge packages 11 therefrom. Typically, any number of unloading stations or outfeed chutes 18, which are adjacent the package sorting conveyor 10 on one or both sides thereof, receive the packages 11 discharged from the sorting conveyor 10 and carry the packages to waiting storage bins, trucks, etc. Packages may be manually placed on the conveyor carts 20 or may be delivered to the sorting conveyor 10 via infeed chutes 17 or the like.

The conveyor track 12 includes two parallel rails 14 and may be built to conform to the layout of any warehouse, shipping center, distribution center, or the like. Best seen as resembling the track of a roller coaster, the conveyor track 12 may be substantially horizontal or may ascend and descend. The conveyor track rails 14 may lie in the same horizontal plane, or one may be higher than the other, such as would be the case in a banked curve in the track 12. Banked curves are greatly advantageous because they allow the conveyor carts 20 to move around a curved conveyor track 12 at a much greater speed without spilling packages 11 than on a flat track. Preferably, the rails 14 are generally tubular, again similar to a roller coaster, and are supported by rail support members 16 only on the outwardly facing edges of the rails. The rails 14 may be round or rectangular in cross-section. Rectangular cross-section is preferred since it has been found that round rails cause the cam followers to wear somewhat in their center because the load is not as well distributed as when rectangular rails are utilized.

Figure 2:
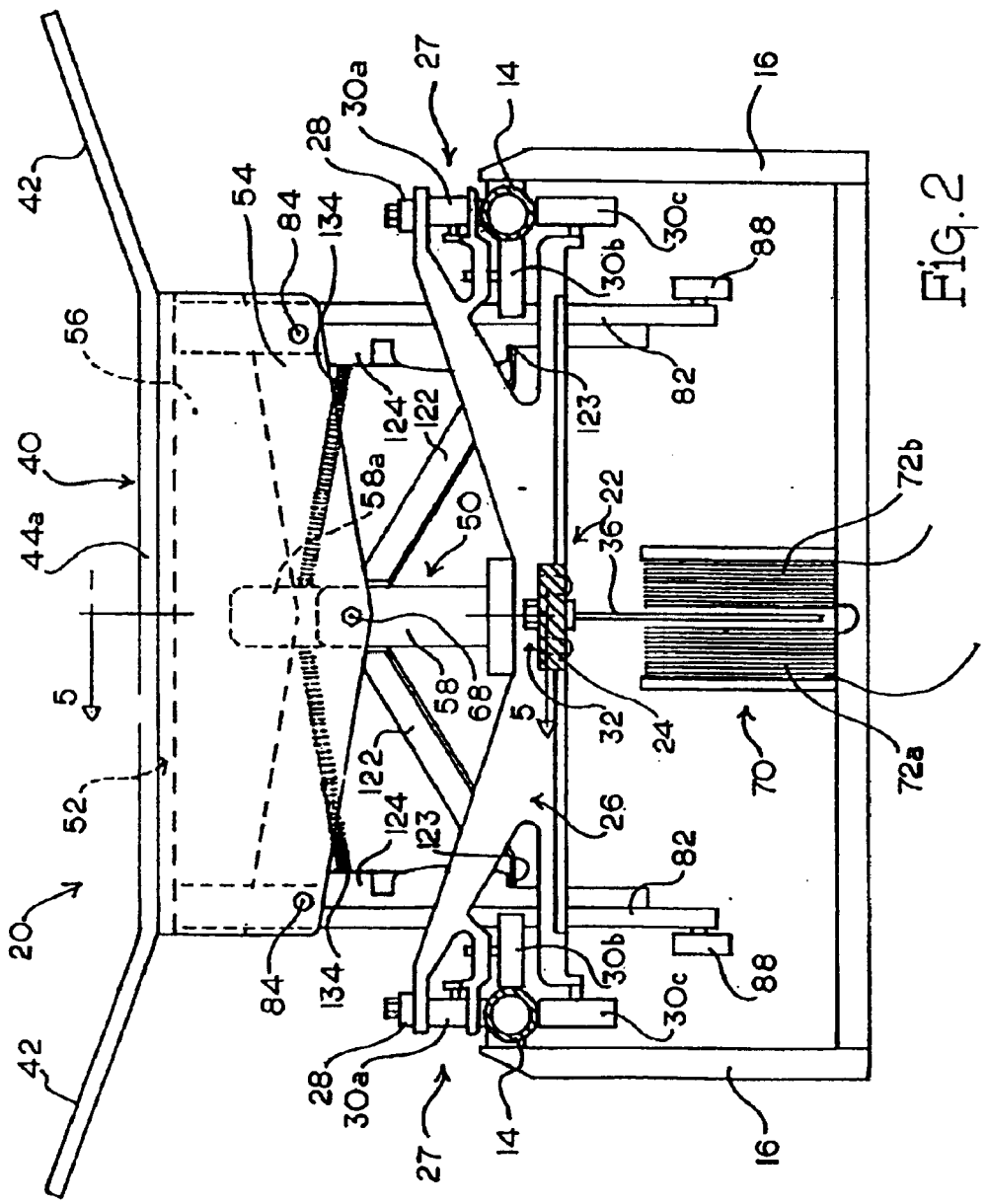
FIG. 2 is front, elevational view of a single tilting conveyor cart of the package sorting conveyor and the power source of the conveyor.

The power source 70 of the sorter conveyor 10, which is shown in FIG. 2, is preferably a vertically oriented linear induction motor (LIM) 70. The LIM 70 of the present invention replaces the conventional steel flux plate with a second electromagnetic coil 72b, which is preferably identical to, but out-of-phase with, a first electromagnetic coil 72a. Each electromagnetic coil performs the function of the steel plate for the other electromagnetic coil, i.e. electromagnetic coil 72a provides a flux path for electromagnetic coil 72b and vice versa. Elimination of the conventional steel plate reduces the weight of and, accordingly, the energy required to move the train of conveyor carts 20.

Figure 4:
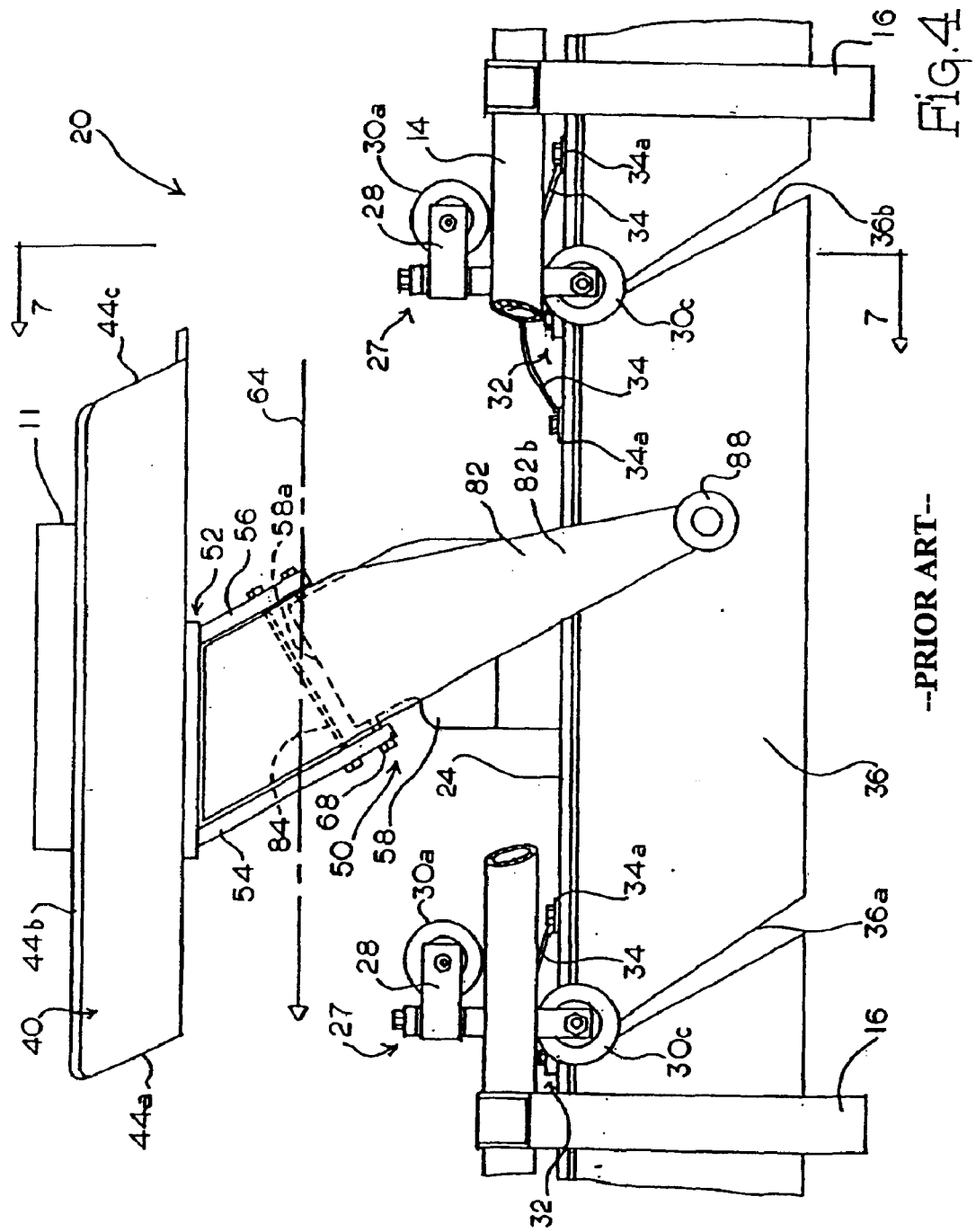
FIG. 4 is an elevational side view of one of the tilting conveyor carts of the present invention.

The LIM 70 is vertically oriented so that a drive fin 36, which is attached to the bottom of each conveyor cart 20, hangs downwardly in between the two electromagnets 72a, b. Composed of aluminum or other conductive metal, the vertical fin 36 preferably has swept-back front 36a and rear 36b edges, as shown in FIG. 4, giving the fin 36 a generally parallelogram shape. Vertically orienting the fin 36 and the LIM 70 greatly reduces problems with maintaining proper spacing between the fin 36 and the electromagnets 72a,b, because gravity ceases to be a factor and because the two electromagnets 72a,b, both attract the fin 36 equally. This results in the fin 36 being easily maintained equidistant between the two electromagnets 72a,b of the LIM 70 of the invention, thereby preventing the fin 36 from contacting one of the electromagnets and being seized in place.

The electromagnets 72a,b are out-of-phase with respect to each other so that the inductive force they create will flow in the same direction. In other words, the electromagnets 72a,b are electrically out-of-phase while physically opposed to each other so as to supplement each other's inductive forces on the fin 36, instead of canceling each other out. This helps provide a consistent motive force on the train of conveyor carts because longitudinal thrust remains constant even if the fin 36 is pulled slightly closer to one of the electromagnets 72a,b of the LIM 70. While the longitudinal thrust is thereby increased with respect to the closer electromagnet, the longitudinal thrust with respect to the more distant electromagnet is proportionally decreased. Thus, total longitudinal thrust in the direction or line of travel remains constant even if the fin 36 wavers slightly from side to side. While a small degree of lateral fin movement may occur, the structure of the carts and the opposing pull of the electromagnets 72a,b prevent the fin from being pulled into contact with either electromagnet. The LIM 70 ordinarily moves the train of conveyor carts 20 in one direction of travel; however, it can also be reversed if necessary to run the sorting conveyor backwards.

Now turning to the train of tilting conveyor carts 20, each cart 20 includes three major sub-assemblies, shown best in FIG. 2: a trailer frame structure 22, a generally horizontally disposed carrying tray 40 for holding the packages 11, and a tiltable support apparatus 50 for supporting the carrying tray 40 above the trailer frame structure 22 and for allowing tilting of the carrying tray 40 towards either side of the sorting conveyor 10 to unload a package into one of the unloading stations. Each cart 20 is built around a base trailer frame structure 22 to which other components of each cart 20 are mounted.

As shown in FIG. 3, the trailer frame structure 22 includes a longitudinal base member 24 that extends in the direction of conveyor travel 64 between the two parallel rails 14. Preferably, the base member 24 is substantially equidistant from each rail 14. A roller structure 26 for riding on the conveyor track 12 is mounted on a front end of the base member 24 and includes two laterally extending roller wheel mechanisms 27, one for each rail 14. The reason for the outboard placement of the rail supports 16 and the tubular shape of the rails 14 becomes apparent upon examining the roller wheel mechanisms 27. Each roller wheel mechanism 27 includes three roller wheels: an upper roller wheel 30a for riding on the top edge of the rail 14, a middle roller wheel 30b for riding on an inside edge of the rail 14, and a lower roller wheel 30c for riding on the bottom edge of the rail 14. With this configuration, it is almost impossible for a cart 20 to jump the track 12, because a wheel is provided for each directional force (sideways, upward, and downward) that a cart 20 may encounter when traveling along the track 12. Preferably, each roller wheel 30a,b,c is constructed of a somewhat resilient material such as polyurethane to provide for smooth, quiet, relatively vibration-free operation of the sorter conveyor 10.

Figure 3A:
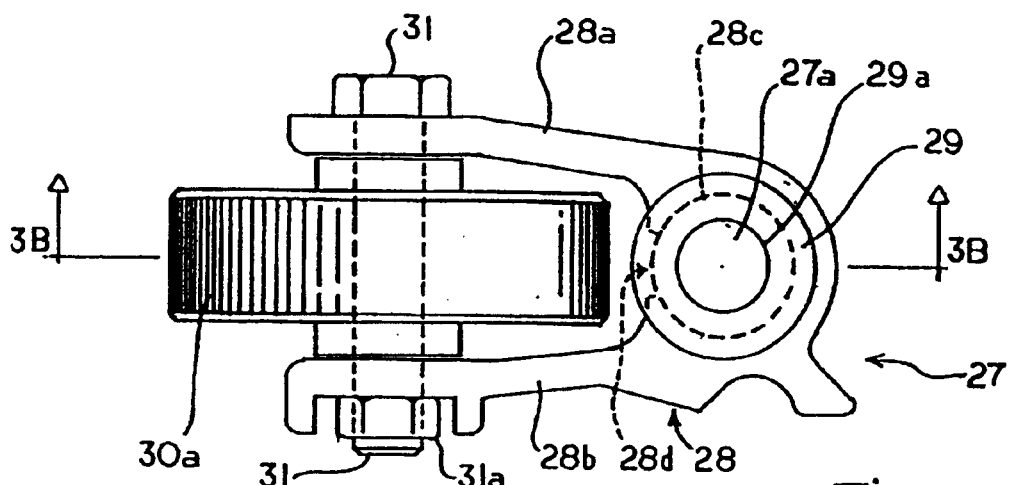
FIG. 3A depicts a top view of an axle caster that holds a cam follower on one of the conveyor carts.
Figure 3B:
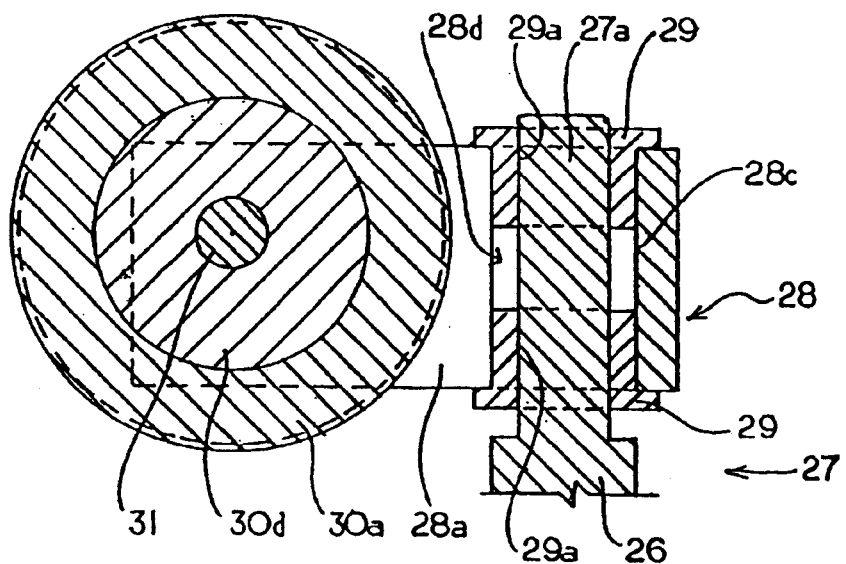
FIG. 3B is a cross-sectional view of the axle caster and cam follower of FIG. 3A, taken along lines 3B—3B.

Referring now especially to FIGS. 3A and 3B, the structure of each roller wheel mechanism 27 that holds the top wheel 30a is shown in greater detail. Each top roller wheel 30a is retained by an axle caster 28 that is preferably formed from extruded aluminum or the like. The axle caster 28 includes two forks 28a and 28a, one on each side of the wheel 30a, and a bearing bore 28c disposed at the juncture of the two forks 28a,b, which has an opening 28d on one side so that the bearing bore 28c communicates with the space between the forks 28a,b. A pair of flange bearings 29 seated in the bearing bore 28c are disposed around an axle shaft 27a extending from the roller structure 26. Preferably formed of "oilite" or other friction-reducing material, each flange bearing 29 has the form of a top-hat bushing and includes a center hole 29a through which passes the axle shaft 27a. The roller wheel 30a is held in place between the two forks 28a,b by a bolt 31 and nut 31a. Preferably, the roller wheel 30a includes a bearing structure 30a disposed around the bolt 31, which serves as an axle running through the center of the wheel 30a.

Due to wear, axle casters inevitably tend to become loose and allow the roller wheels to chatter back and forth, which would inhibit smooth, quiet, vibration-free operation of a sorting conveyor. Previously designed axle casters typically have a bearing around the axle shaft that must be pressed out when worn and replaced with a new bearing that must be pressed in. This requires a press in addition to more time and expense than is desirable in a large sorting conveyor system. The axle caster 28 shown in FIGS. 3A and 3B provides flange bearings 29 which can easily be slid into place by hand into the bearing bore 28c without using a press. Then, to immovably secure the flange bearings 29 inside the bearing bore 28c, the forks 28a,b are slightly flexed inwardly towards each other as the nut 31a is tightened onto the bolt 31 to hold the wheel 30a in place. The forks 28a,b of the axle caster 28 are therefore formed minutely wider apart than would be necessary to merely hold the wheel 30a. When the forks 28a,b are flexed inwardly towards each other by tightening the nut 31a on the bolt 31, the opening 28d of the bearing bore 28c is closed somewhat and the bearing bore 28a is itself slightly distorted, securely retaining the flange bearings 29 therein. The flange bearings 29 themselves are, however, not significantly distorted and are free to swivel back and forth on the axle shaft 27a. Therefore, the flange bearings 29 can easily and immediately be replaced on-site when worn, eliminating much down-time that would be required if conventionally designed axle casters were used in the conveyor cart 20.

Adjacent carts 20 in the train are connected together using hitch mechanisms 32. Each hitch mechanism 32 is shown in FIGS. 3 and 4 as including a front hitch 32a mounted on the front end of the base member 24 in front of the roller structure 26 and a rear hitch 32b mounted on the rear end of the base member. In the embodiment disclosed, each hitch 32a,b has a vertical throughbore, through which a hitch pin connector 32c is inserted. Preferably, the hitch mechanisms 32 are configured so that the front hitch 32a on a rearward cart is disposed overtop of the rear hitch 32b on a forward cart. In the alternative, the hitch mechanisms 32 may comprise a poly-directional spherical ball joint mechanism similar in structure to an automotive trailer hitch. In either case, friction between hitch mechanism components is preferably reduced by, for example, lining the hitch components with TEFLON® or other relatively friction-free material.

To prevent adjacent conveyor carts 20 from separating should the hitch mechanism 32 accidentally break or become uncoupled, an auxiliary cart connector 34 is preferably connected between the trailer frame structures 22 of adjacent carts 20. In the preferred embodiment, the auxiliary cart connector 34 is a metal cable or lanyard, although other high-tensile strength materials could be used. In the embodiment depicted, the auxiliary cart connector 34 is an approximately 3/16th inch thick metal cable connected to adjacent trailer frame structures 22 with metal mounting connectors 34a.

The primary reason that metal is the preferred material for the auxiliary cart connector 34, besides its strength, is so that the auxiliary cart connector 34 will also serve as a continuous electrical connector between adjacent carts 20. Electrical continuity between carts 20 is important because of static electricity build-up while the carts 20 are traveling around the conveyor track 12. However, because the roller wheels 30a,b,c are preferably formed of polyurethane (an electrical insulator) and because the components of the hitch mechanism 32 are preferably coated with TEFLON® (also an electrical insulator), electrical continuity between adjacent carts 20 would not otherwise be effectively achieved. By electrically connecting the carts 20, static charges can be bled off from the train, which is important for safety and operational considerations. Thus, the auxiliary cart connector 34 serves two important purposes: first, it physically attaches two adjacent conveyor carts 20 and prevents them from becoming completely separated should the hitch mechanism 32 fail; second, it enables electrical continuity among all of the conveyor carts 20 in the train.

The configuration of the conveyor cart 20 of the present invention, with its forwardly mounted roller structure 26, particularly structured hitch mechanism 32, and swept-back fin 36 is a significant improvement over previously designed conveyor carts. In conventional conveyor carts, the roller structures are typically mounted at the rear end of the trailer frame and the rear hitch is disposed overtop of the forward hitch. When a hitch mechanism breaks or becomes accidentally uncoupled with this old configuration, the result is that the forward end of the trailer frame drops below the conveyor track and is pushed over underlying structures or the floor, leading to inevitable damage to the sorter conveyor.

With the present design, even without the auxiliary connector cable 34, only the rear end of the trailer frame structure 22 will drop below the conveyor track 12 upon accidental disengagement of the hitches 32a,b or upon breakage of the hitch mechanism 32. Therefore, instead of the front end 36a of the driven fin 36 digging into the floor or underlying structures below the conveyor, as is the case with prior art conveyors, the driven fin 36 will simply be dragged with relatively minimal damage should one of the hitches 32 break or become accidentally uncoupled. If an auxiliary connector cable 34 is attached between two adjacent carts 20 that break apart, the connector cable 34 will limit the distance that the rear end of the trailer frame structure 22 will drop, further limiting damage.

Mounted atop the trailer frame structure 22 of each conveyor cart 20 is the tiltable support apparatus 50, which supports the carrying tray 40 thereabove. As can best be seen in FIG. 5, the tiltable support apparatus 50 generally includes three components: an upper support structure 52 joined to a bottom surface of the carrying tray 40, a lower support structure 58 centrally mounted atop the longitudinal base member 24, and an angled pivot structure 60 pivotally connecting the lower support structure 58 to the upper support structure 52 along a pivot axis 62.

In turn, the upper support structure 52 includes a front support member 54 and a back support member 56. The lower support structure 58 is preferably generally planar, lying in the vertical plane parallel to the conveyor line of travel 64, and includes an angled upper edge 58a. The pivot structure 60 preferably includes an axle 68 that runs either through or along the upper edge 58a of the lower support structure 58 and is connected to the front and back support members, 56, 58, respectively. Preferably, the axle 68 runs through lower regions of the front and back support members 56, 58. As can be seen, the front support member 54 depends farther down from the carrying tray 40 than the back support member 56. While the lower support structure 58 is stationarily fixed to the trailer frame 22, the axle 68 allows the upper support structure 52 to pivot along the pivot axis 62 of the pivot structure 60.

In an alternate embodiment of the tiltable support apparatus (not shown), the upper support structure 52 could also comprise, like the lower support structure 58, a generally planar member that lies in the vertical plane parallel to the conveyor line of travel 64. In this case, the angled pivot structure 60 could take on the form of a hinge structure joining together the two generally planar support structures 52, 58.

Figure 5:
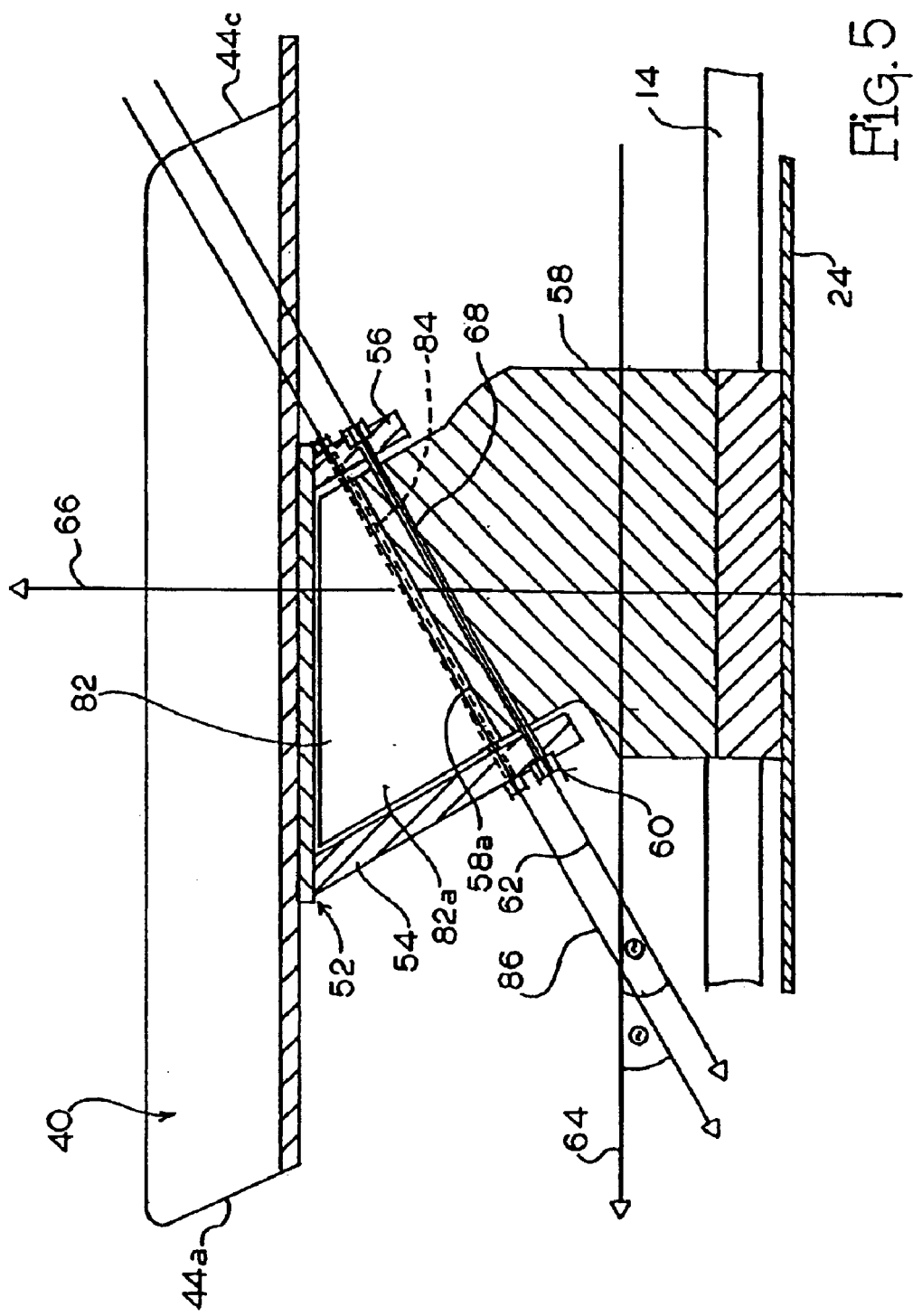
FIG. 5 is a sectional side view of a tilting conveyor cart, taken along lines 5—5 of FIG. 2, which shows the tiltable support apparatus and the angled pivot structure of the tilting conveyor cart of the invention.

The pivot axis 62 lies in a vertical plane parallel to the conveyor line of travel, which is shown in the drawings as horizontal line 64. However, unlike conventional sorter conveyor tilting carts, the pivot axis 62 of the conveyor cart 20 of the invention is disposed at an angle θ to the conveyor line of travel 64 so as to impart two axial components to the tilting of the carrying tray 40. Preferably, the pivot axis 62 is angled downwardly at an angle of approximately 20 to 45 degrees below horizontal in a forward direction. In the embodiment disclosed, the pivot axis 62 is angled downwardly 30 degrees. As can be seen in FIG. 5, the pivot axis 62 preferably intersects a plane occupied by the carrying tray 40 rearward of the center of the tray 40.

By disposing the pivot axis 62 at a downwardly directed angle θ instead of parallel to the conveyor line of travel 64, two axial components are imparted to the tilting motion of the carrying tray 40. The first axial component of the tray's tilting motion is lateral tipping on a horizontal axis parallel to the conveyor line of travel 64. The second axial component of the tray's tilting motion is rotating around a vertical axis 66 perpendicular to the conveyor line of travel. Thus, while the tray only tilts along a single, angled pivot axis 62, the overall motion of the tray 40 as it tilts includes two axial components.

Figure 5A:
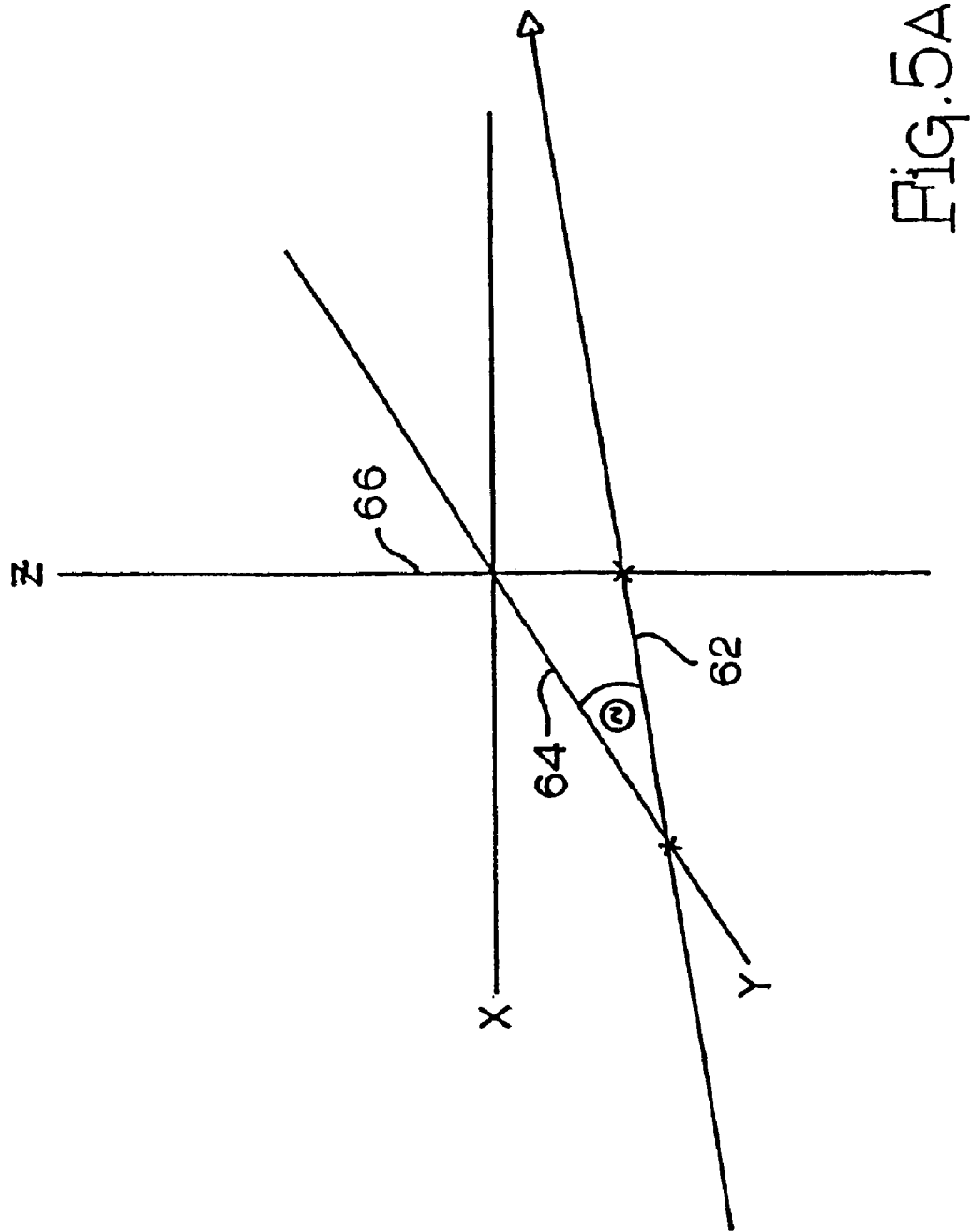
FIG. 5A is a geometric depiction of the conveyor cart pivot axis and conveyor line of travel as they relate to three-dimensional X, Y, Z spatial coordinates.

The tilting motion of the tray may also be described using three-dimensional X, Y, and Z-axis spatial coordinates, as shown in FIG. 5A, wherein the Y-axis is parallel to the conveyor line of travel 64, the X-axis extends horizontally perpendicular to the line of travel 64, and the Z-axis extends vertically perpendicular to the line of travel 64. In the present invention, tilting of the tray 40 includes a Y-axis and a Z-axis component, for as shown in FIG. 5A the pivot axis 62 intersects the Y and Z axes. Specifically and for illustrative purposes only, using the preferred 37.5 degree downward angle θ of the pivot axis 62, it can be appreciated that the ratio of Y-axis motion to Z-axis motion is 60:30. In other words, with a 30 degree angle θ, the tray 40 laterally tips somewhat farther than it rotates. If the angle θ of the pivot axis 62 is increased to 45 degrees below horizontal, then the tray will tilt and rotate equally.

Figure 6:
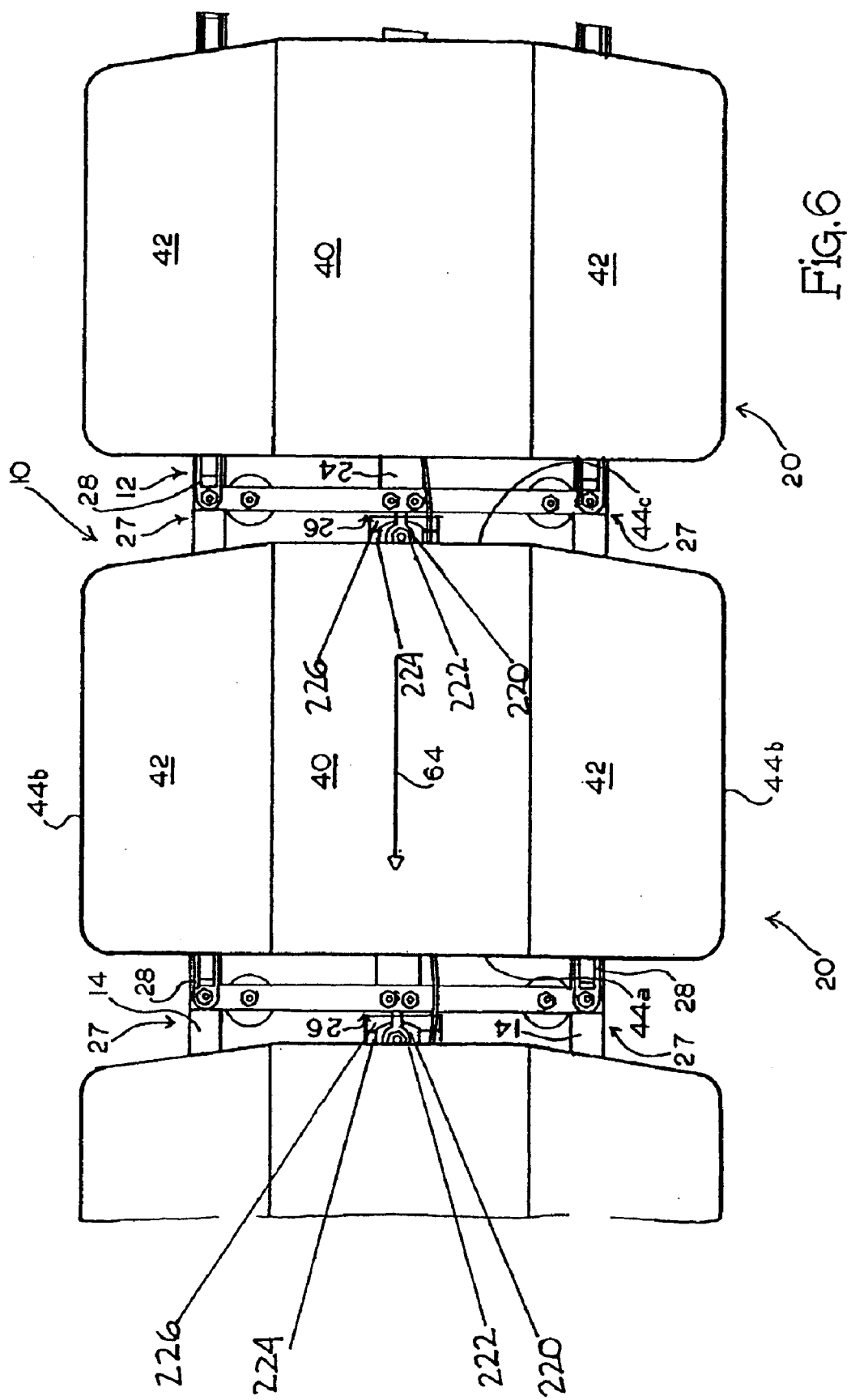
FIG. 6 is a top view of the train of carts of the package-sorting conveyor of the present invention.
Figure 6A:
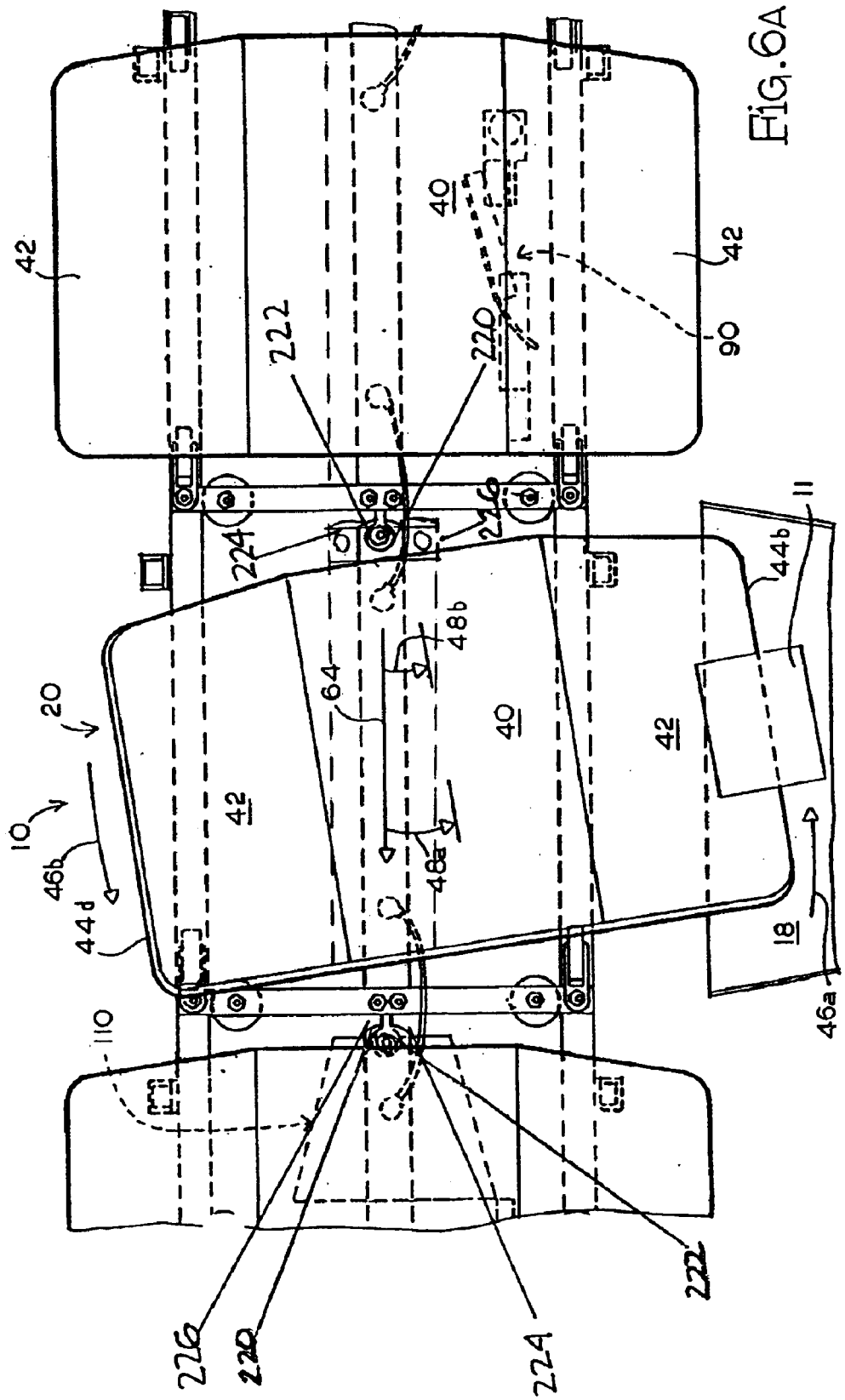
FIG. 6A shows the train of carts of FIG. 6, but with one of the carts in its tilted position and unloading a package onto an unloading station beside the sorting conveyor track.

As shown in FIGS. 6 and 6A, one effect of this two-axis tilting of the carrying tray 40 is that a side 44b of the tray that is tilted downwardly also rotates rearwardly relative to the cart 20, as shown in FIG. 6A by line 46a. Side 44b of the tray, which is tilted upwardly, rotates forwardly relative to the cart 20, as shown in FIG. 6A by line 46b. In the preferred embodiment, in which the pivot axis 62 intersects the plane occupied by the tray 40 rear-of-center, the front side 44b of the tray 40 rotates a greater distance around the vertical axis 66 than the back side 44c of the tray 40, upon tilting of the tray 40. As shown in FIG. 6A, the bisecting centerline of the tray 40 rotates farther at its forward end from the horizontal line of travel 64 than at its rearward end. Thus, front side rotation line 48a follows a longer arc than back side rotation line 48b. By rearwardly rotating whichever side of the tray 40 is being tilted downwardly, some rearward velocity is imparted to packages 11 as they are being discharged from the cart 20 of the invention into an unloading station 18.

Thus, packages are discharged at a lower velocity relative to the unloading station than the velocity of the train of conveyor carts as a whole. This enables the packages to be discharged into a narrower chute than could be accomplished using a conventional conveyor cart. Additionally, because the packages are slowed down somewhat as they are discharged, there is less potential for damage to occur.

As can be seen in the drawings, the tray 40 may also include upwardly angled lateral wings 42 to help prevent packages 11 from accidentally falling off the tray 40. These wings 42 also decrease the angle of the slope created when the tray 40 is tilted, which helps with gentle handling of the packages 11 as they are discharged from the cart 20.

When a carrying tray 40 reaches a particular destination unloading station 18, the tilting mechanism 80 tilts the carrying tray 40 to cause a package 11 carried thereon to be discharged into the unloading station 18. The tilting mechanism 80 generally includes components mounted on each conveyor cart 20 and components associated with each unloading station 18. First is a pair of actuating arms 82 attached beneath each cart's carrying tray 40 on opposite lateral sides thereof, one actuating arm 82 on each side of the cart's tiltable support apparatus 50. Second is a pull-down mechanism 90 immediately upstream from each unloading station 18. The pull-down mechanism 90, when activated, selectively pulls down one of the actuating arms 82 and thereby pulls the respective side of the tray 40 downwardly and rearwardly into the biaxially tilted position described above. Third is a push-up mechanism 110 downstream of the unloading station 18, which pushes up the actuating arm 82 pulled down by the pull-down mechanism 90 and thereby reorients the tray 40 into its normal, upright position. Fourth is a locking structure 120, which locks the carrying tray 40 in the tilted position upon pulling down of one of the actuating arms 82, and which also locks the carrying tray 40 in its normal, upright position upon pushing up of that actuating arm 82.

Figure 7A:
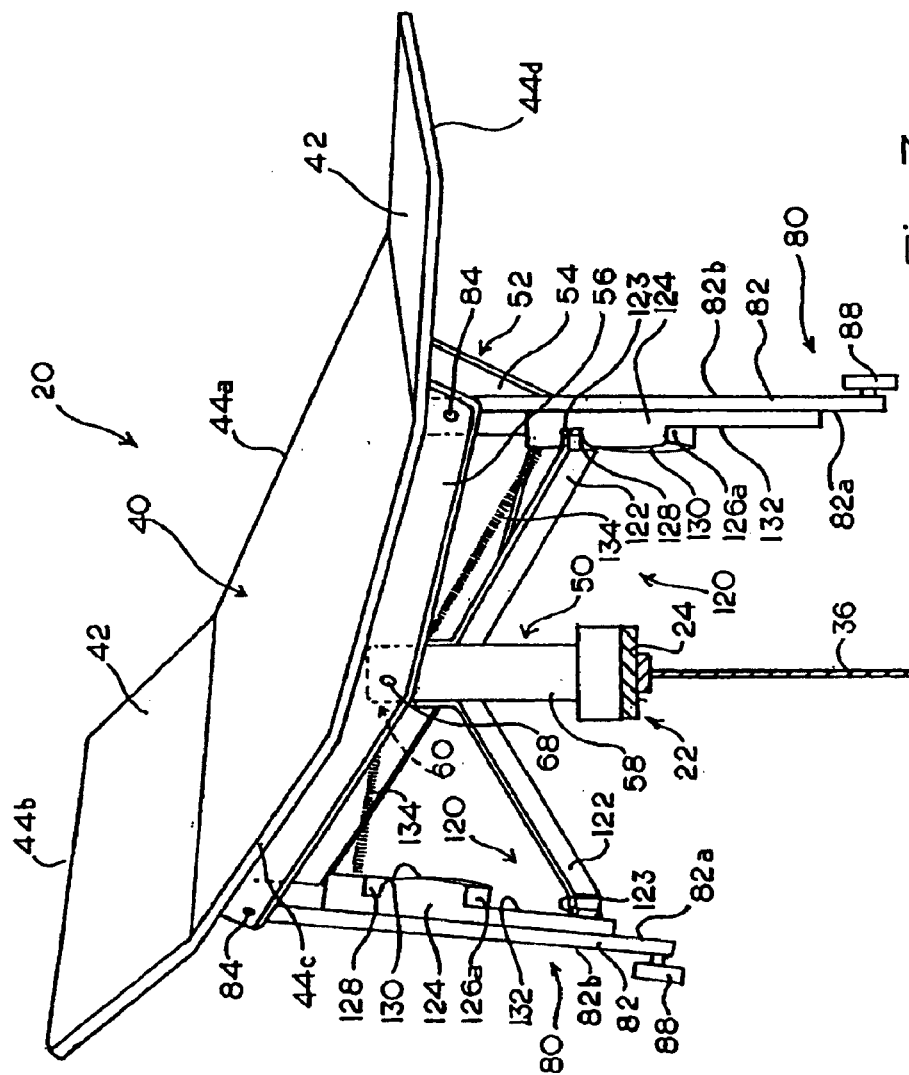
FIG. 7A shows the tilting conveyor cart of FIG. 7 in its tilted position.

Referring now to FIGS. 7 and 7A, each actuating arm 82 is pivotally attached to the underside of one side of the carrying tray and is preferably connected to the front and back support members, 54 and 56 respectively, of the upper support structure 52. In the embodiment shown, the actuating arm 82 is attached to the front and back support members by an angled pivot hinge axle 84 that runs through both support members 54, 56 and through the upper end of the actuating arm 82. The actuating arm 82 therefore pivots on a pivot axis 86 that is preferably parallel to the pivot axis 62 of the tiltable support apparatus 50, as shown in FIG. 5. As can be seen from an examination of the drawings, the actuating arms 82 and their respective pivot axes 86 remain substantially in a vertical plane parallel to the conveyor line of travel 64 when stationary and when being pulled down or pushed up.

Each actuating arm 82 also includes a roller wheel 88, which engages the pull-down and push-up mechanisms 90, 110, as will be described below. The roller wheel 88 is preferably mounted on the lower end of the actuating arm 82 on an outer surface thereof. It is conceivable, however, that the roller wheel 88 could be replaced with a friction reducing slide block or other protrusion for engagement by the pull-down and push-up mechanisms 90, 110.

Seen in detail in FIGS. 8, 8A; 9, 9A; 10 and 10A, a pull-down mechanism 90 is associated with each unloading station 18 and is located beneath the rail 14 running closest to the unloading station 18 on the upstream side thereof, as indicated in FIG. 6A. The pull-down mechanism 90 includes a descending ramp 92 and a laterally pivoting switch 94 that, when actuated, pivots open and directs the roller wheel 88 of a passing actuating arm 82 into the descending ramp 92. As can be seen in the drawings, when the switch 94 is not actuated, the switch is in a closed position parallel to the ramp 92, and the roller wheel 88 is free to bypass the switch and the descending ramp 92. However, when a particular package 11 arrives at its destination unloading station 18, the switch 94 is automatically actuated so that it pivots open into the path of the passing roller wheel 88, capturing the roller wheel 88. The roller wheel 88 then rolls through the switch 94, causing the actuating arm 82 to pivot outwardly somewhat, and into the descending ramp 92. As the roller wheel 88 rolls through the switch 94, the roller wheel 88 engages a closure flange 104 having a curved end 106 to thereby pivot the switch 94 back to its closed position, as the roller wheel 88 exits the switch 94 and enters the descending ramp 92. Next, the descending ramp 92 forces the roller wheel 88 and the associated actuating arm 82 downwardly so as to pull down one side of the tray 40, thereby discharging the package from the tray 40 into the unloading station 18 adjacent the pull-down mechanism 90.

A computer controller (not shown) is used to track all packages 11 moving on the conveyor 10 and to automatically actuate a switch 94 at the appropriate time when a particular package 11 reaches its destination unloading station or outfeed chute 18. The computer is also connected to the LIM 70 to control the movement of the conveyor train and maintain a desirable rate of speed.

In one embodiment of the switch 94, a biasing member 96, such as a coil spring, is used to constantly urge the laterally pivoting switch 94 towards its open position. However, to prevent the switch 94 from always remaining open and thereby capturing every passing roller wheel 88, a lock catch 98 is provided to hold the switch closed. The lock catch 98 pivots on a horizontal pivot member 98a between the normal, horizontal position shown in FIG. 8A, which holds the switch 94 closed, and the tilted position shown in FIG. 8, which allows the switch 94 to swing open.

A catch 102 depending from the forward end of the switch 94 engages an outboard side of the lock catch 98 as the switch is held closed. When the switch 94 is closed by the action of the passing roller wheel 88 on the closure flange 104, the depending catch 102 slides over a slanted end 98b of the lock catch 98 back into position on the outboard side of the lock catch 98.

Beneath the forward end 98c of the lock catch 98 opposite the slanted end 98b is a vertically oriented solenoid 100, which is actuated by the computer controller. Upon receiving a short pulse of electricity from the computer controller, the vertical solenoid 100 pushes the forward end 98c of the lock catch 98 upwardly to pivot the lock catch 98 and release the depending catch 102 of the switch 94. The switch 94 is then swung into its open position by the biasing spring 96, where it captures the next passing roller wheel 88. Another embodiment of the switch is described in commonly owned U.S. Pat. No. 6,009,992, issued Jan. 4, 2000, which is hereby incorporated by reference in its entirety.

After the carrying tray 40 has been tilted and a package carried thereon has been discharged into an unloading station 18, the carrying tray is reoriented into its normal upright position by the push-up mechanism 110. Seen best in FIGS. 10 and 10A, a push-up mechanism 110 is associated with each unloading station 18 and is located beneath the track 12 adjacent the unloading station 18 on the downstream side thereof, as indicated in FIG. 6A. Each push-up mechanism 110 includes an ascending ramp 112 below the rail 14 adjacent the unloading station 18. The push-up mechanism 110 also includes a wedge-shaped frog 114 that engages the roller wheel 88 on a pulled-down actuating arm 82 and directs the roller wheel 88 into the ascending ramp 112. The frog 114 is positioned low enough below the track 12 so that roller wheels 88 will be engaged and directed into the ascending ramp 112 only if they have already been pulled down by the pull-down mechanism 90. As the roller wheel 88 is directed into the ascending ramp 112, the actuating arm 82 is pivoted outwardly somewhat so that the outside edge of the locking flange 122 will disengage from the tilted position locking channel 127. To help pull the actuating arm 82 back into substantially vertical alignment after the locking flange 122 has slid over the slide surface 130, the top of the ascending ramp 112 includes an inwardly turned section 116.

Now turning to the locking structure 120 of the tilting mechanism 80, it can be seen best in FIGS. 7 and 7A that the locking structure 120 includes a pair of locking flanges 122, a pair of locking blocks 124 mounted one each to the actuating arms 82, and a biasing member 134 for biasing the actuating arms 82 inwardly into a locked position. Preferably, the locking flanges 122 laterally extend from both sides of the lower support structure 58 of the tiltable support apparatus 50, although they could also be mounted to the trailer frame structure 22. In the embodiment disclosed, the locking flanges 122 comprise generally planar steel plates having rollers 123 mounted to their outer edges. In an alternate embodiment, the rollers 123 could be eliminated and the locking blocks 124 made of a low-friction material on which the roller-less outer edges of the locking flanges 122 could easily slide.

Each locking block 124 is mounted to an inner surface 82a of the actuating arm 82 and includes two locking channels 126 and 134 separated by a cammed section 130 having a generally convex outer surface. The lower 126 of the two locking channels receives the roller 123 at the outer edge of the lateral locking flange 122 when the carrying tray 40 is in its upright position. The upper 134 of the two locking channels receives the roller 123 when the carrying tray 40 is in its tilted position. As the tray 40 is tilted from one position to the other, the roller 123 rolls over the cammed section 130 interposed between the two locking channels 126, 134. Preferably, the locking blocks 124 are made of a wear-resistant material such as plastic, although other materials could be used. The biasing member, which may be a spring 134, pulls the actuating arms 82 inwardly so as to engage the locking structure 120 by seating the locking flanges 122 in one of the locking channels 126, 134.

During tilting of the tray 40 by the pull-down mechanism 90, the actuating arm 82 being pulled down is pivoted outward slightly on the pivot axis 86 as the roller wheel 88 is captured by the switch 94 and directed into the descending ramp 92. This outward pivoting of the actuating arm 82 causes the upright position-locking channel 126 to disengage from the locking flange 122. Then, as the roller wheel 88 is pulled down by the descending ramp 92, the locking flange 122 rolls upwardly over the cammed section 130. Because of the curved, convex shape of the cammed section 130 of the locking block 124, the actuating arm 82 remains substantially vertical as it is pulled down. This helps prevent the roller wheel 88 from slipping out of the descending ramp 92 of the pull-down mechanism 90. Eventually, the locking flange 122 is seated in the tilted position locking channel 134 as the wheel exits the descending ramp 92 and the tray 40 reaches its fully tilted position. The degree to which the tray 40 is tilted in the fully tilted position can vary depending on the configuration of the locking blocks 124 and the pull-down mechanism 90. However, in the embodiment disclosed, the tray 40 is tilted approximately 37.5 degrees from horizontal in the fully tilted position.

The biasing member 134 holds the tilted position locking channel 134 and the locking flange 122 together while the cart 20 is moving past the unloading station 18, stabilizing the tray 40 in the tilted position. Then, when the downwardly pulled actuating arm 82 reaches the push-up mechanism, the arm 82 is pivoted outwardly by the wedge-shaped frog 114 engaging the roller wheel 88. This outward pivoting causes the locking flange 122 to disengage from the tilted position-locking channel 134. As the roller wheel 88 moves up the ascending ramp 112, the locking flange rolls downwardly over the cammed section 130. As the inwardly turned top end 116 of the ascending ramp 112 pivots the actuating arm 82 back to its vertical orientation, the locking flange 122 seats in the upright position locking channel 126, where it is held in place through the action of the biasing member 134.

The actuating arm 82 on the opposite side of the conveyor cart 20, which is not being pulled down or pushed up at a particular unloading station 18, simply rises and falls with the side of the tray 40 to which it is attached. The locking flange 122 on this side of the cart 20 simply rolls over a flat section 132 of the locking block 124 below the upright position locking channel 126.

In an alternate embodiment (not shown) of the package-sorting conveyor 10 of the invention, the conveyor cart 20 could include a tiltable support apparatus having a pivot axis that is not angled downwardly but that is generally parallel to the conveyor line of travel 64. In this case, the tilting motion of the carrying tray 40 would only have a single axial component—lateral tipping on a horizontal axis parallel to the conveyor line of travel 64. While package sorting conveyors having a single-axis lateral tipping motion have been designed in the past, they do not include the other inventive features of the present sorting conveyor 10 such as the vertically oriented LIM 70, the hitch mechanism 32 and auxiliary cart connector 34, and the tilting mechanism 80 with its associated components.

Such single-axis conveyor carts would primarily be incorporated into the package-sorting conveyor 10 of the present invention for use in sorting particularly large packages that must be carried by two or more adjacent carrying carts 20. In this case, the trays of the adjacent carts would be simultaneously tilted as the carts reached an unloading station to discharge the package. This would also of course require an especially wide outfeed chute as well as a pull-down mechanism adjacent the unloading station for each cart to be simultaneously tilted.

The reason that single-axis conveyor carts are especially useful for sorting large packages is that it has been found that this double (or triple, etc.) unloading of particularly large packages using the two-axis carrying carts 20 of the present invention occasionally presents difficulties due to the carrying trays 40 not being in the same spatial plane when they are both in their fully tilted positions. Therefore, for double unloading, it is preferable to use the alternate, single-axis embodiment of the conveyor cart.

Several configurations of the package sorting conveyor 10 may be employed that utilize the alternate, single-axis conveyor carts for double unloading situations. A preferable configuration would comprise two adjacent single-axis carts for carrying a single large package. A second configuration would comprise a leading two-axis conveyor cart 20 and a trailing single-axis cart. A third configuration would comprise a leading single-axis conveyor cart and a trailing two-axis conveyor cart 20. As a whole, the package sorting conveyor 10 of the invention may include both two-axis conveyor carts 20 as well as single-axis conveyor carts interspersed among each other depending on a particular facility's conveying and sorting requirements.

Figure 11:
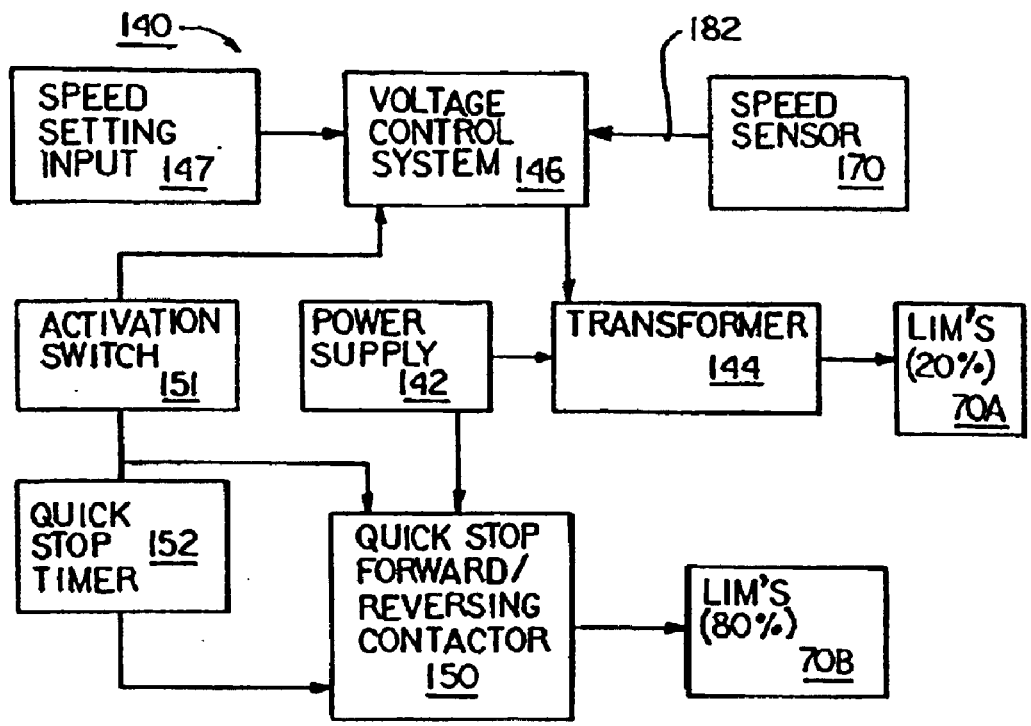
FIG. 11 is a schematic block diagram of the control system for the LIM motors.

FIG. 11 shows a control system for the LIM motors, generally designated 140, according to a preferred embodiment of the present invention. The speed control system 140 for the conveyor sorter 10 includes three subsystems: a voltage control system 140 that provides a fixed frequency, variable voltage output to the LIM 70; a quick stop control system; and a cart locating system.

According to this aspect of the invention, the speed of the conveyor sorter 10 is controlled by way of a feedback arrangement comprised of a power supply 142, a voltage controller 146 for controlling the voltage of the LIM's 70a, a transformer 144 that receives an input from the voltage controller 146 and that provides a fixed frequency, variable voltage output to the LIM's 70a, and a speed sensor assembly 170.

In the prior art, the speed of a conveyor sorter generally was controlled by varying the frequency of the electrical current to the LIM with an AC inverter. It has been discovered, that this conventional variable frequency control system, however, tends to cause the LIM to overheat. In the present invention, eighty percent of the LIM's 70b are powered by a direct electrical connection, operating at a constant frequency of about 60 cycles per second. To the contrary, the prior art generally used a control system that varies the frequency of the electrical current to all of the motors.

If, however, all of the LIM's 70 were powered by a direct connection, there would be no way to vary the frequency or the voltage of the electric current to the LIM's 70 and, therefore, no way to vary the speed of the sorter conveyor 10. Thus, in the present invention, approximately eighty percent (80%) of all the LIM's 70b are powered directly from the AC power supply, and the remaining approximately twenty percent (20%) of the LIM's 70a are powered by a transformer 144 that is controlled by a voltage control system 146.

By decreasing the voltage to some of the LIM's 70a, the motor torque is decreased, slippage between the tray fin 36 and the motor increases and the sorter conveyor 10 moves more slowly.

In operation, as schematically shown in FIG. 11, the voltage controller 146 receives a signal from a speed setting input 147, which receives the desired speed of the conveyor sorter 10 from the operator. For example, a computer keyboard can be used for inputting the desired speed and a computer monitor can be used to display the desired speed that has been inputted. A speed sensor assembly 170 continuously measures the speed of the conveyor sorter 10, and provides a signal of the conveyor sorter 10 speed to the voltage controller 146, which is continuously compared to the speed setting input 147 for purposes of regulating the voltage of the current applied to the associated LIM's 70.

In the preferred embodiment, a speed sensor assembly 170 constructed according to the present invention comprises at least one pair of U-shaped proximity switches 172a,b that are attached below the conveyor frame and positioned adjacent to the passage of fin 36. The switches 172a,b are operable to detect the approximately one (1) inch gaps between each aluminum fin 36 attached to the bottom of each conveyor cart 20 and which hangs downwardly in between the two electromagnets 72a, b.

Figure 12:
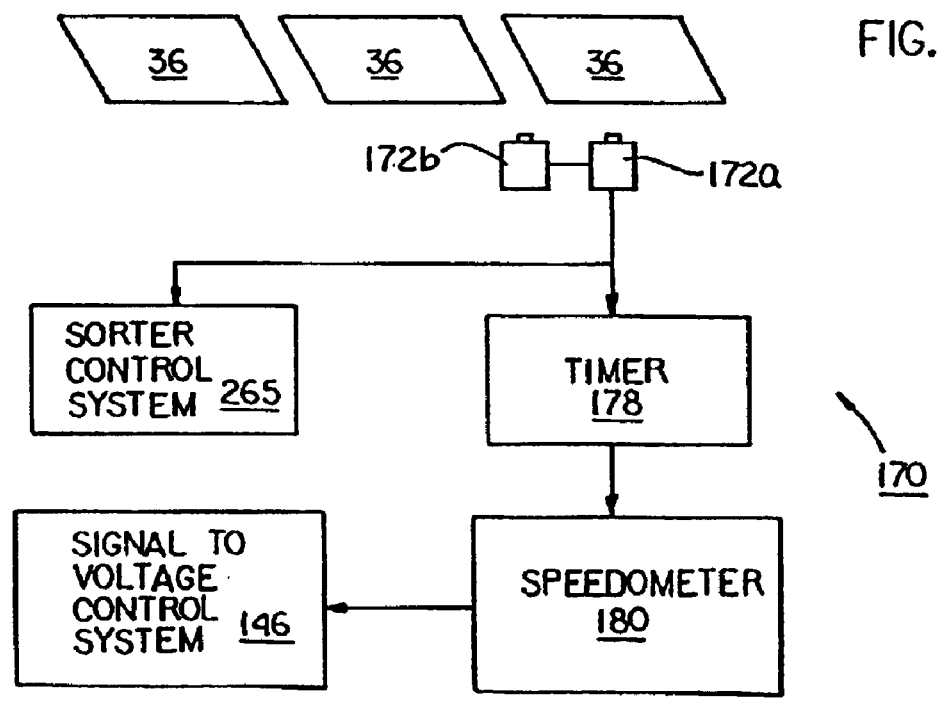
FIG. 12 is a schematic block diagram of the speed sensor assembly.

The centers of the proximity switches 172a,b are mounted approximately two (2) inches apart. As a conveyor cart 20 moves around the track 12, the proximity switches 172a,b transmit a signal to a timer 178, which measures the amount of time it takes the air gap in each aluminum fin 36 to travel from the first proximity 172a to the second proximity switch 172b. A speedometer 180 then calculates the speed of the conveyor cart 20 and sends a signal 182 to the voltage controller 146, which then compares the actual speed of the conveyor cart 20 to the set point. The voltage controller then sends a signal to the transformer 144 to increase or decrease the voltage to the selected LIM's 70. This arrangement is shown in FIG. 12.

In the preferred embodiment, as many as 12 pairs of these sensors are used around the conveyor track and the speedometer 180 continuously calculates the speed of the conveyor carts 20 as each sensor is "tripped" by the gap between the carts.

In an alternative embodiment, a single sensor could be used to measure the time between the end of one fin and the beginning of the next fin and, if the length of each fin was known, the speed of the tray could also be calculated. However, it is believed that the preferred embodiment, using a pair of sensors spaced apart a fixed distance, would usually be more accurate since the measurement is made in only the time it takes the gap to move about two inches instead of the time it would take for an entire tray to pass a single sensor.

Under normal conditions, the sorter conveyor 10 is stopped by removing power to all LIM's 70 and the sorter conveyor coasts to a stop. The present invention, however, also includes a quick stop control system, which includes a contactor 150 and a quick stop activation switch 151.

In operation, if an emergency occurs, the operator of the sorter conveyor 10 activates the activation switch 151, the contactor 150 "forward" opens, which removes the power from the voltage controlled LIM's 70a and reverses the three-phase power to the directly powered LIM's 70b. By reversing the three phase power to the directly powered LIM's 70b, the stopping distance of the sorter conveyor is approximately one-half of the stopping distance under normal conditions.

After the sorter conveyor 10 comes to a complete stop, the sorter conveyor 10 may reverse direction and move several inches along the track 12 until the casters 30a mounted to the load bearing axle 28 splay out in the turns of the track 12 and stop the backward movement of the sorter conveyor 10. In the preferred embodiment, a timer 152 removes all power to the directly powered LIM's 70b after a predetermined period of time after the operator activates the contactor 150.

Figure 13:
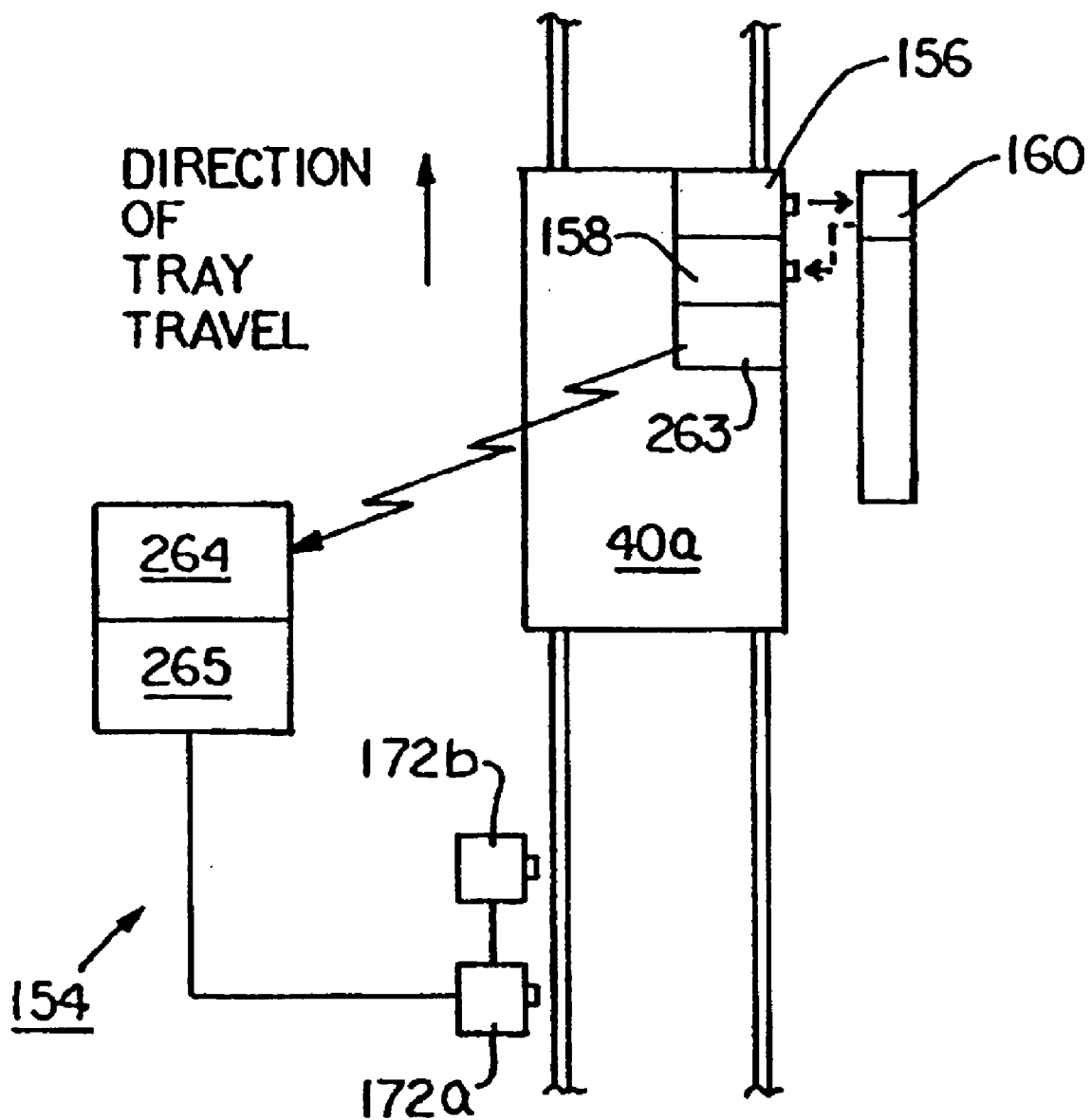
FIG. 13 is a schematic flowchart of the cart locating system.

In one embodiment of the present invention, as shown in FIG. 13, a cart locator system 154 includes a retro-reflective strip 160 that is fixably secured to each pull-down mechanism 90 at each chute and an unique carrying tray 40 that is arbitrarily designated as "tray one" 40a. A light source 156 and photocell 158 is secured directly to the "tray one" 40a and emits a continuous light focused down upon where the pull-down mechanism 90 is located.

In the prior art, the problem was as sortation systems became larger and larger, it was becoming more and more difficult to locate a cart with respect to firing a pull-down mechanism to tip the right cart and not one cart before or one cart after. For example, in a 1200 chute sortation conveyor each tray is fired off at one of 1200 tippers based on a reference point. That is the computer lets tray 1 go 2014 inches after tray 1 passes the reference point and that is where the right tip and that tray should correspond to one another.

In the prior art, a database is built in the computer manually for each tray and each location using two technicians each having a walkie-talkie. The sorter would be run at speed and the technicians would try to see if the tipper was firing early or firing late, i.e. getting the wrong tray at that location. If the trays were on 22 inch centers, 22 inches would be added or subtracted and the test would be run again depending on whether it was one tray early or one tray late. However, it could be that it was just getting or just missing a tray. As systems have become larger, the problem has become larger too.

One alternative is to have intelligent tippers that are able to identify each cart individually. However, this "multiplex" technique is very expensive and, as shown during the 1995 start-up at the Denver Airport, can be extremely troublesome to get up and running.

In operation of the present invention, when "tray one" 40*a* carrying the light source 156 passes the pull-down mechanism location, the retro-reflective strip 160 reflects the light which is detected by photocell 158, which is secured adjacent to the light source 156. When the photocell 158 senses the reflected light, an electronics package 263 located on tray one 40*a* emits a radio frequency signal that is received by a receiver 264, which is mounted in close proximity to the sorter control system 265. This signal system is well-known in the art for sending a RF signal to a transmitter module at a remote location, such as those found in a conventional burglar alarm system. This system provides for the sorter control system 265 to know the location of tray one 40*a* at a precise moment in time.

Preferably, the trays, including "tray one" 40*a*, referred to as the Smart Tray™, are run around the track a number of times therefore automatically building the database for each pull-down mechanism with respect to the reference point without requiring several weeks to do so. For example, using the prior art technique it took 6 weeks to synchronize 400 tippers. Significantly, the present invention required only 1 day to synchronize 200 tippers.

Once the position of tray one 40*a* has been determined, the position of every other device in the system can be determined as a function of the number of pulses received from the sensor 172*a,b* because each pulse is proportional to distance. As tray one 40*a* proceeds around the track, the sorter control system 265 counts the number of pulses it receives from sensors 172*a,b*. The control system upon receipt of the input from tray one captures the current pulse count and places it in a list. The first signal and captured count represents the distance to the first tray, and so on respectively until a count is captured for every pull-down mechanism position.

In the present invention, the distance gap between successive carts can easily be modified to make installations at various manufacturing sites go more smoothly. Track length, when installed at the installation site, can vary a few inches one way or another from the drawings. One way to handle this variation is to be able to readily adjust the distance between the carts so that they will fit appropriately on to the track and run smoothly. These length adjustments should be easy to accomplish in the field during installation.

The apparatus of the present invention permits length adjustments to be easily made both during installation and subsequent operation on an as needed basis. The apparatus of the present invention attaches a leading cart to a trailing cart by an adjustment spacer bar 200, which can vary the distance between the two carts.

Figure 14:
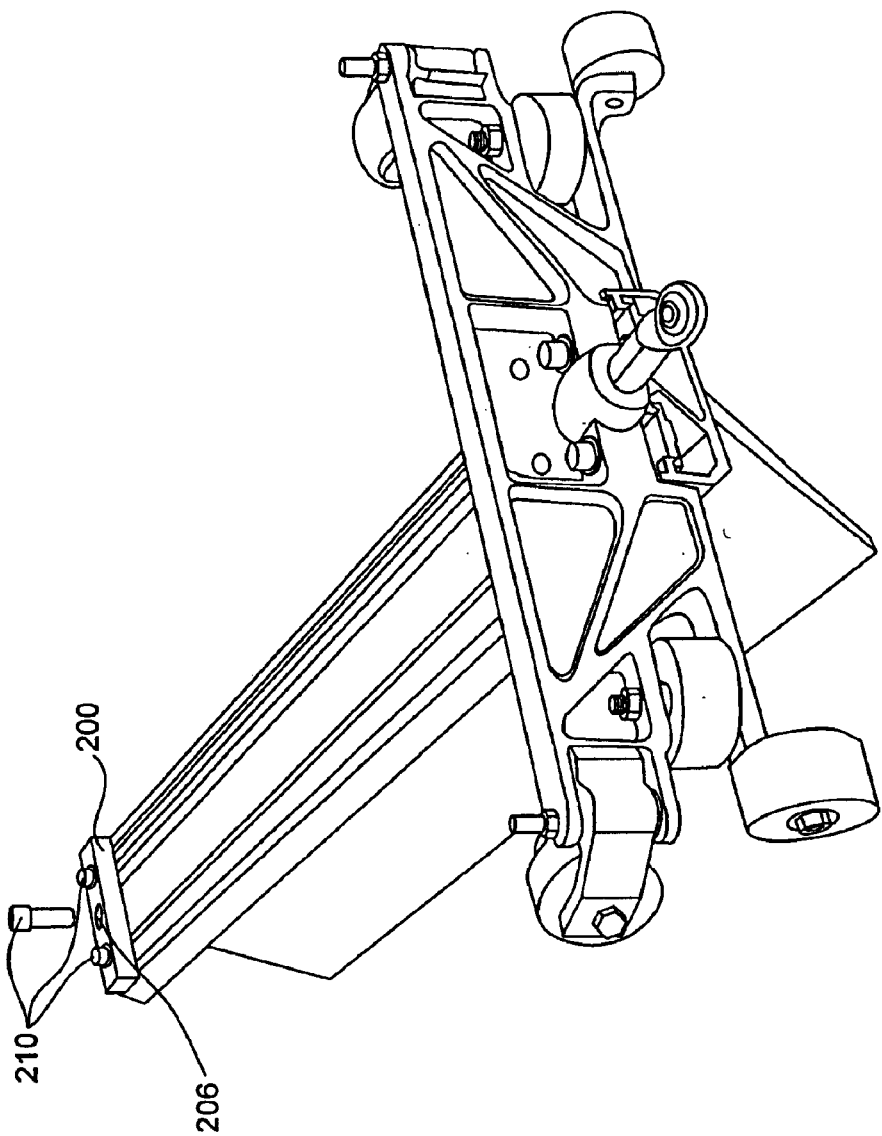
FIG. 14 is an exploded, perspective view of the trailer frame structure of a single conveyor cart, but with the tiltable support apparatus and the carrying tray of the conveyor cart removed for clarity.

In the present invention, the gap between successive carts can easily be modified to make installation account for various manufacturing and site variables by replacing the rear hitch 32, shown in FIGS. 2, 3 and 4, with adjustment spacer bar 200, as can be seen in FIG. 14.

Figure 15:
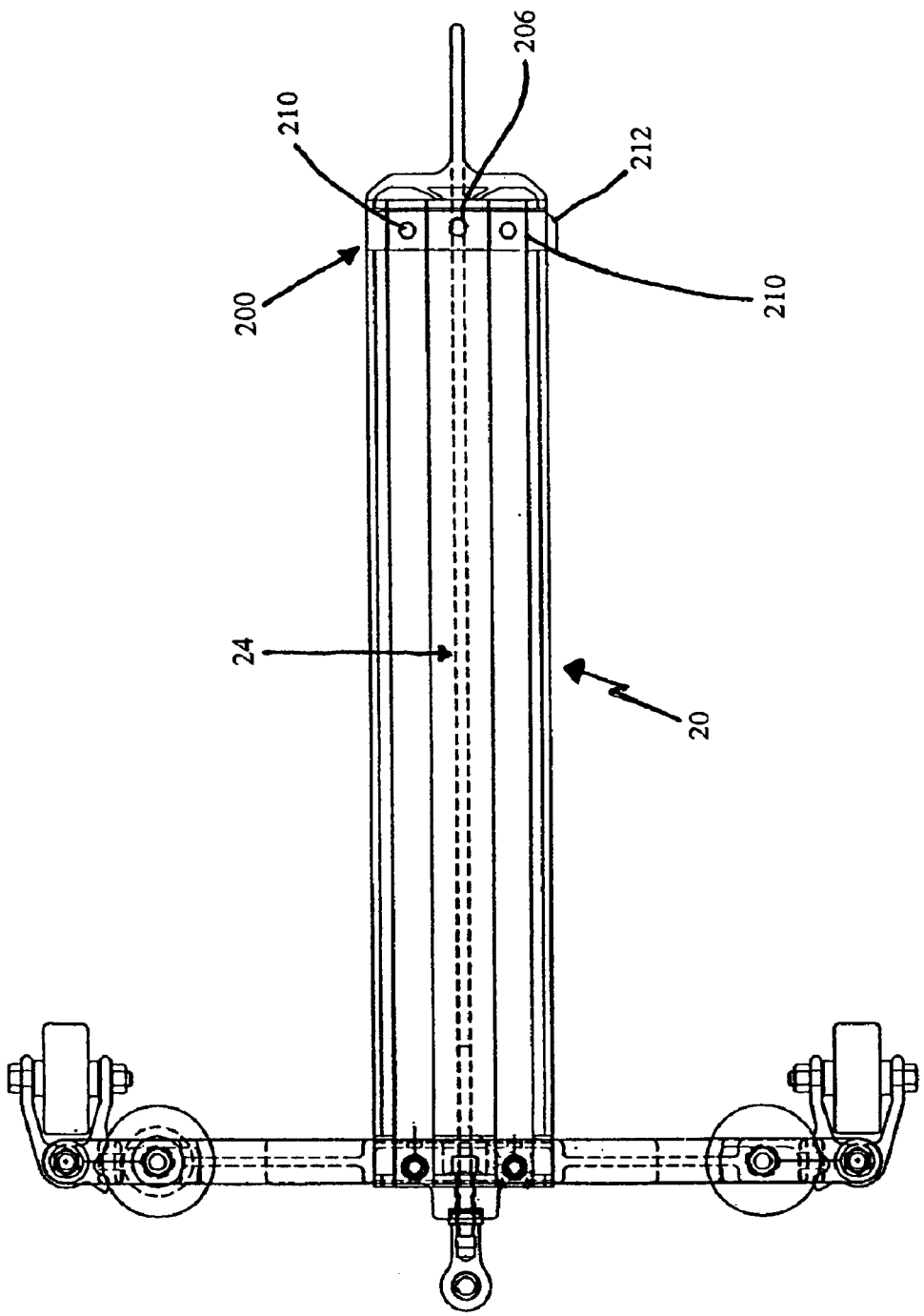
FIG. 15 is a top view of the trailer frame structure of the single conveyor cart, but with the tiltable support apparatus and the carrying tray of the conveyor cart removed for clarity.
Figure 15A:
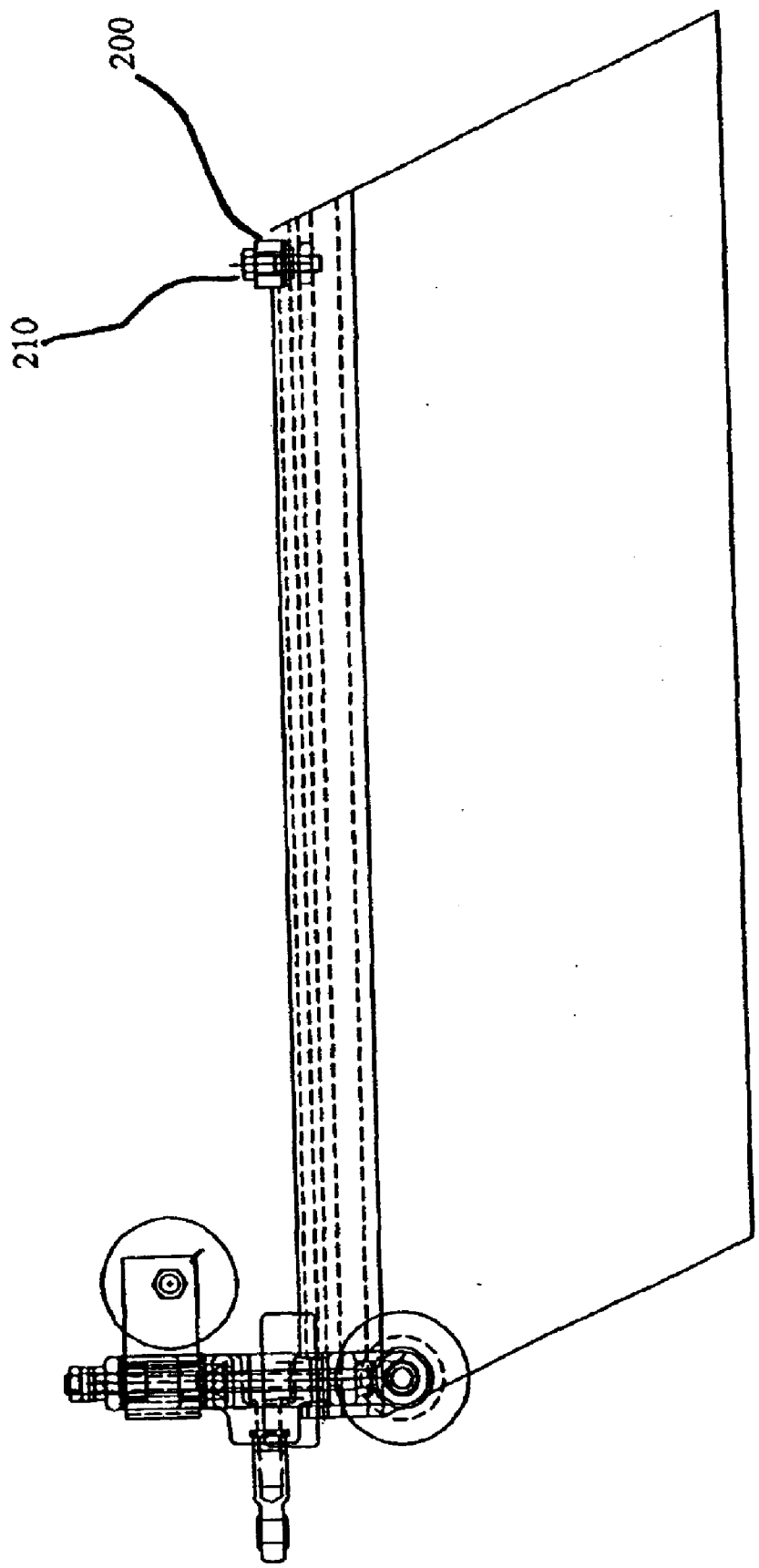
FIG. 15A is a side view of the trailer frame structure depicted in FIG. 15.

As shown in FIGS. 15 and 15A, the adjustment spacer bar 200 replaces the rear hitch 32 and is attached using fasteners 210 to the fastening apertures 202. If the track is longer than the train of carts, the adjustment spacer bar 200 is oriented so that the connecting aperture 206 is oriented towards the end of the cart, thus widening the distances between the carts. The position indicator 212 is oriented to identify which way the adjustment spacer bar 200 has been rotated. Similarly, but not shown, if the track is shorter than the train of carts, the adjustment spacer bar 200 should be oriented so that the connecting aperture 206 is oriented toward the front of the cart, thus reducing the distances between the carts. The adjustment spacer bar 200 can be utilized in the field to insure that cart distances can be varied according to the length of the track after the final installation of the track.

Figure 16:
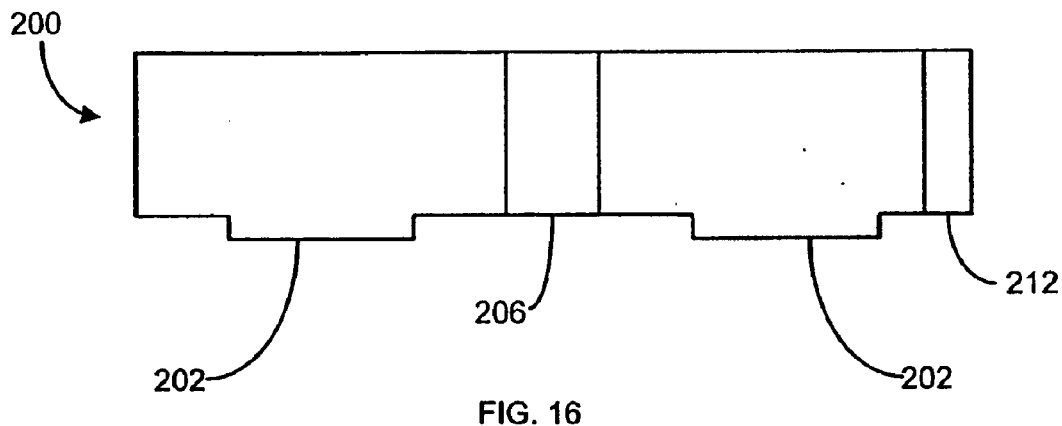
FIG. 16 is an enlarged side view of the adjustment spacer bar.
Figure 16A:
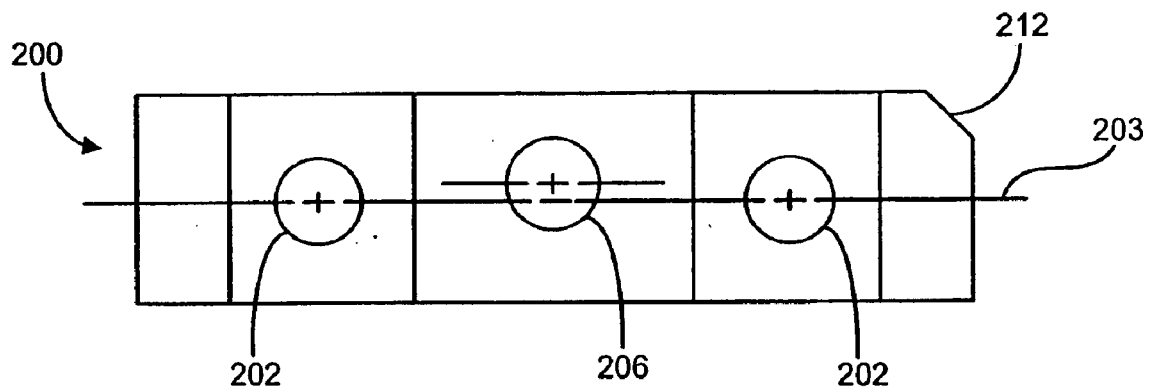
FIG. 16A is an enlarged top view of the adjustment spacer bar.

As best seen in enlarged FIGS. 16 and 16A, the adjustment spacer bar 200 preferably has two fastening apertures 202 at opposed ends of the adjustment spacer bar 200. The fastening apertures 202 are preferably co-linear about a centerline 203 (see FIG. 16A). Disposed between the fastening apertures 202 is a connecting aperture 206. As discussed above, the connecting aperture 206 is offset from centerline 203 (see FIG. 16A) to permit adjustment of the spacing between adjacent carts.

The adjustment spacer bar 200 preferably has a position indicator 212, shown as a chamfer on one corner of the adjustment spacer bar 200 in FIG. 16 and installed in FIG. 15. The position indicator 212 may also be color-coded in order to make identification of the spacing between the carts significantly easier to determine.

The present invention may further include a gap monitor 220, shown in detail in FIGS. 6A and 6B. The gap monitor 220 is designed to monitor the distance gap between adjacent currents. During the installation process the distance between the carts will be set at a predetermined distance so that the overall length of the carts, including the spaces between the carts, precisely fits the track of the sorter 10. The gap monitor 220 insures that these preset distances remain constant and provides notice where the distances have changed through operation or some other event, thereby permitting immediate adjustment to insure proper operation of the track 20 of the conveyor system 10 on the track 12. Rapid identification of distance variations by the gap monitor 220 permits immediate adjustment thereby reducing the downtime of operation of the conveyor system 10. The gap monitor 220 includes a plurality of detectable elements 222 that are placed at predetermined positions on unique carts. The detectable elements 222 may be on the trailing edge of the fin 36, as best seen in FIG. 7, of the leading cart 20. In the preferred embodiment the sensor 224 detects the presence of the detectable elements 222 on comparator 226 will detect and compare the difference in the spacing of the carts with the predetermined space setting.

Certain modifications and improvements will occur to those skilled in the art upon a reading of the foregoing description. For example, while the impulse sensor is described with discreet components, they could also be logic functions incorporated on a microprocessor or an integrated circuit. It should be understood that all such modifications and improvements have been deleted herein for the sake of conciseness and readability but are properly within the scope of the following claims.

What is claimed is:

1. A sorting conveyor for transporting objects and unloading objects at one or more unloading stations adjacent the conveyor, said sorting conveyor comprising:
   (a) a conveyor track;
   (b) a train of conveyor carts connected end-to-end;
   (c) a power source for moving said conveyor carts on said conveyor track;
   (d) each of said conveyor carts including: (i) a trailer frame base, including: a roller structure for engaging said conveyor track, a driven member responsive to said power source, and a hitch mechanism for connecting each conveyor cart to an adjacent conveyor cart; (ii) a carrying tray for holding the objects; and (iii) a tiltable support apparatus for supporting said carrying tray above said trailer frame base and for allowing tilting of said carrying tray towards at least one side of the conveyor to unload objects into unloading stations on at least one side of the conveyor;
   (e) an adjustment spacer between adjacent carts wherein said adjustment spacer is an adjustment spacer bar; and
   (f) a gap monitor for monitoring the gap between adjacent carts.

2. The apparatus according to claim 1, wherein said gap monitor includes a plurality of detectable elements at predetermined positions on unique carts; at least one sensor for detecting the presence of said elements and a comparator for comparing the difference between the detected presence of said elements and a reference value.

3. The apparatus according to claim 2, wherein said detectable elements are located within the edges of said unique carts.

4. The apparatus according to claim 3, wherein said edges of said unique carts are located on a trailing edge of a leading cart and a leading edge of a trailing cart.

5. The apparatus according to claim 2, wherein said sensor for detecting the presence of said elements is a proximity sensor.

6. The apparatus according to claim 5, wherein said proximity sensor further includes an inductive sensor.

7. The apparatus according to claim 2, wherein said reference value is a predetermined time difference.

8. The apparatus according to claim 2, wherein said reference value is a predetermined distance difference.

9. The apparatus according to claim 8, wherein said predetermined distance is a gap length.

10. The apparatus according to claim 8, wherein predetermined distance is a cart length.

11. The apparatus according to claim 1, wherein said tiltable support apparatus includes: an upper support structure joined to said carrying tray, a lower support structure joined to said trailer frame base, and a pivot structure connecting the upper support structure to the lower support structure along a pivot axis; and a tilting mechanism for tilting said carrying tray on said tiltable support apparatus to thereby unload objects into one of the unloading stations adjacent the conveyor, wherein said tilting mechanism includes: a pair of actuating arms attached to said carrying tray on opposite sides of said tiltable support apparatus; and a pull-down mechanism associated with each unloading station for selectively pulling down one of said actuating arms so as to pull one side of said carrying tray downwardly into a tilted position; wherein each of said actuator arms includes a cam follower on a lower end of said actuator arm, and wherein said pull-down mechanism includes a descending ramp adjacent said conveyor track, a laterally pivoting switch for directing the cam follower of a selected actuator arm into said descending ramp and an actuator connected to said laterally pivoting switch for opening said laterally pivoting switch so as to capture a selected cam follower and direct the cam follower into the descending ramp and for closing said laterally pivoting switch after capture of the cam follower and wherein said tilting mechanism further comprises a locking structure for locking said carrying tray in the tilted position upon pulling down of one of said actuating arms, and for locking said carrying tray in the upright position upon pushing up of said actuating arm.

12. The apparatus according to claim 11, wherein said actuating arms are each pivotally attached to said carrying tray beneath said carrying tray.

13. The apparatus according to claim 12, wherein the pivot axes of said actuating arms are parallel to the pivot axis of said tiltable support apparatus.

14. The apparatus according to claim 12, wherein said actuating arms are pivotally attached to said upper support structure of said tiltable support apparatus.

15. The apparatus according to claim 12, wherein the pivot axis of said pivot structure lies in a vertical plane parallel to the conveyor line of travel, and wherein said actuating arms remain substantially parallel to the vertical plane parallel to the conveyor line of travel during pulling down and pushing up of said actuating arms to tilt said carrier tray.

16. The apparatus according to claim 11, wherein said locking structure includes:
   (a) a pair of laterally extending locking flanges on opposite sides of said tiltable support apparatus;
   (b) a pair of locking blocks mounted to inner surfaces of said actuating arms, each locking block having locking channels that receive said locking flanges; and
   (c) a biasing member attached to both actuating arms for biasing said actuating arms towards each other so as to urge said each of said locking flanges into one of said locking channels.

17. The apparatus according to claim 16, wherein each locking block includes a locking channel associated with the tilted position of said carrying tray, and wherein each locking block includes a locking channel associated with the upright position of said carrying tray.

18. The apparatus according to claim 17, wherein each said locking flange includes a roller mounted to an outer edge thereof.

19. The apparatus according to claim 18, wherein each said locking block includes a cammed section between said locking channels over which said rollers on the outer edges of said locking flanges roll.

20. The apparatus according to claim 1, wherein said conveyor track comprises two parallel rails.

21. The apparatus according to claim 20, wherein said trailer frame base includes a longitudinal base member that extends between the two parallel rails parallel to the conveyor line of travel.

22. The apparatus according to claim 21, wherein said roller structure comprises two laterally extending cam follower mechanisms, one cam follower mechanism riding on each conveyor track rail.

23. The apparatus according to claim 20, wherein each said cam follower mechanism includes an axle caster that holds a cam follower, each said axle caster including two forks, a bearing bore disposed at a juncture between said two forks, and at least one flange bearing seated within said bearing bore and disposed around an axle shaft extending from said roller structure.

24. The apparatus according to claim 23, wherein said cam follower is held in place in said axle caster by a nut and bolt extending through said cam follower and both of said forks, wherein said axle caster also includes an opening on one side of said bearing bore that communicates with a space between said two forks, and wherein said at least one flange bearing is secured within said bearing bore by tightening said nut and bolt so as to inwardly flex said two forks towards each other, thereby slightly closing said opening and distorting said bearing bore.

25. The apparatus according to claim 22, wherein each conveyor track rail is supported only on an outside edge, and wherein each cam follower mechanism comprises three cam followers.

26. The apparatus according to claim 25, wherein each cam follower mechanism includes an upper cam follower for riding on a top edge of a track rail, a middle cam follower for riding on an inside edge of the track rail, and a lower wheel for riding on a bottom edge of the track rail.

27. The apparatus according to claim 22, wherein the cam follower mechanisms are attached to a forward end of said longitudinal base member.

28. The apparatus according to claim 1, wherein the driven member of said trailer frame base comprises a fin moved in the conveyor line of travel by said power source, said power source including a linear induction motor.

29. The apparatus according to claim 28, wherein said linear induction motor and said metal fin are both vertically oriented beneath said trailer frame base.

30. The apparatus according to claim 29, wherein said metal fin is generally parallelogram-shaped with rearwardly angled front and rear edges.

31. The apparatus according to claim 28, wherein said linear induction motor includes a guide roller assembly comprising at least one guide roller and at least one opposing surface for off-setting the mechanical load of said guide roller.

32. The apparatus according to claim 1, wherein said hitch mechanism comprises a front hitch on a front end of said trailer frame base, a rear hitch on a rear end of said trailer frame base, and a hitch connector for connecting the front hitch of one conveyor cart to the rear hitch of an adjacent conveyor cart.

33. The apparatus according to claim 32, wherein the front hitch is disposed overtop of the rear hitch.

34. The apparatus according to claim 1, wherein said trailer frame base comprises an auxiliary cart connector for connecting each conveyor cart to an adjacent conveyor cart to prevent adjacent conveyor carts from separating upon failure of said hitch mechanism.

35. The apparatus according to claim 34, wherein said auxiliary cart connector comprises an electrically conductive cable connected at one end to said trailer frame base and at another end to a trailer frame base of an adjacent conveyor cart.

36. The apparatus according to claim 1, wherein said sorting conveyor includes at least one single-axis conveyor cart that comprises a tiltable support apparatus having a horizontal pivot axis that is disposed generally parallel to the conveyor line of travel.

37. The apparatus according to claim 11, wherein said actuator includes:
(a) an actuator arm having a first end and a second end, said pivot switch being connected to said first end of said actuator arm; and (b) a bi-directional actuator attached to said actuator arm second end, whereby said rotary actuator assembly is operable to rotate said laterally pivoting switch to engage said cam follower and direct said cam follower of a selected actuator arm into said descending ramp.

38. The apparatus according to claim 37, wherein said bi-directional actuator includes a coil spring attached to said actuator arm second end to rotate said pivot switch to said closed position.

39. The apparatus according to claim 38, further including an outer clevis coaxially aligned around said actuator arm to protect said actuator arm.

40. The apparatus according to claim 39, wherein said actuator arm includes a roll pin extending substantially perpendicular from said actuator arm for connecting said actuator arm to said pivot switch and wherein said outer clevis includes an aperture, said aperture being sized to allow said roll pin to extend outward therefrom into said pivot switch.

41. The apparatus according to claim 37, wherein said bi-directional actuator is a brushless torque actuator.

42. The apparatus according to claim 41, wherein said brushless torque actuator is mounted within a heat sink.

43. The apparatus according to claim 1, wherein said adjustment spacer bar includes a first means for attaching to a leading cart and a second means for attaching to a trailing cart and wherein said first and second means for attaching said adjustment spacer bar are non-co-linear with respect to one another.

44. The apparatus according to claim 43, wherein said first means for attaching said adjustment spacer bar to said leading cart includes at least one fastening aperture for attachment to said leading cart.

45. The apparatus according to claim 44, wherein said first means for attaching said adjustment spacer bar to said leading cart includes a pair of apertures on opposite ends of said adjustment spacer bar.

46. The apparatus according to claim 43, wherein said second means for attaching said adjustment spacer bar to said trailing cart includes at least one connecting aperture and a fastener for attaching to said trailing cart.

47. The apparatus according to claim 43, wherein said non-co-linear adjustment spacer bar is transverse with respect to the longitudinal axis of said carts.

48. The apparatus according to claim 43, wherein said adjustment spacer bar further includes a position indicator.

49. The apparatus according to claim 48, wherein said position indicator is color coded.

50. The apparatus according to claim 48, wherein said position indicator has a specific assembly length.

51. The apparatus according to claim 48, wherein said position indicator further includes identification indicia.

52. The apparatus according to claim 48, wherein said identification indicia is a chamfer on one end of said adjustment spacer bar.

* * * * *